United States Patent
Lu et al.

(10) Patent No.: US 10,425,843 B2
(45) Date of Patent: Sep. 24, 2019

(54) OPTIMIZED PROCESSING METHOD AND APPARATUS FOR TERMINAL SERVICE MIGRATION

(71) Applicant: ZTE Corporation, Shenzhen (CN)

(72) Inventors: Ting Lu, Shenzhen (CN); Feng Xie, Shenzhen (CN); Yin Gao, Shenzhen (CN); He Huang, Shenzhen (CN); Yuanfang Yu, Shenzhen (CN); Li Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/328,314

(22) PCT Filed: Jul. 21, 2015

(86) PCT No.: PCT/CN2015/084717
§ 371 (c)(1),
(2) Date: Jan. 23, 2017

(87) PCT Pub. No.: WO2016/011938
PCT Pub. Date: Jan. 28, 2016

(65) Prior Publication Data
US 2017/0272962 A1    Sep. 21, 2017

(30) Foreign Application Priority Data
Jul. 23, 2014   (CN) .......................... 2014 1 0354512

(51) Int. Cl.
*H04W 24/02* (2009.01)
*H04L 12/24* (2006.01)
(Continued)

(52) U.S. Cl.
CPC ......... *H04W 24/02* (2013.01); *H04L 41/0893* (2013.01); *H04L 67/16* (2013.01);
(Continued)

(58) Field of Classification Search
CPC .. H04W 52/143; H04W 52/244; H04W 28/08
See application file for complete search history.

(56) References Cited

U.S. PATENT DOCUMENTS 8,600,384 B1    12/2013  Moreno et al.
9,351,193 B2*    5/2016  Raleigh ................. H04M 15/80
(Continued)

FOREIGN PATENT DOCUMENTS

CN           1713771 A     12/2005
CN         101043752 A      9/2007
(Continued)

OTHER PUBLICATIONS

International Search Report for corresponding Application No. PCT/CN2015/084717 filed on Jul. 21, 2015; dated Oct. 22, 2015.
(Continued)

*Primary Examiner* — Ernest G Tacsik
(74) *Attorney, Agent, or Firm* — Cantor Colburn LLP

(57) ABSTRACT

Provided are an optimized processing method and apparatus for service migration of a terminal. According to the optimized processing method, when the terminal conducts service transmission with a network or when the terminal performs service migration between a source network element and a target network element, service performance information of the terminal is acquired. By means of the technical solution, the technical problem in the related art that the service performance or service experience, etc. of a terminal is not taken into account during service transmission between a terminal and a network or during service migration of a terminal is solved, so the service performance and service experience can be obtained when the terminal conducts service transmission or service migration, thereby providing a powerful support for optimizing the service (Continued)

migration or service transmission of the terminal and improving the experience of a user.

20 Claims, 11 Drawing Sheets

(51) Int. Cl.
| | | |
|---|---|---|
| *H04L 29/08* | (2006.01) | |
| *H04W 8/08* | (2009.01) | |
| *H04W 36/00* | (2009.01) | |
| *H04W 36/26* | (2009.01) | |
| *H04B 17/318* | (2015.01) | |
| *H04L 12/26* | (2006.01) | |
| *H04W 28/02* | (2009.01) | |

(52) U.S. Cl.
CPC ..... *H04W 8/082* (2013.01); *H04W 36/00837* (2018.08); *H04B 17/318* (2015.01); *H04L 41/142* (2013.01); *H04L 43/0847* (2013.01); *H04L 43/0864* (2013.01); *H04L 43/0888* (2013.01); *H04W 28/0236* (2013.01); *H04W 36/26* (2013.01)

(56) References Cited

U.S. PATENT DOCUMENTS

| | | | | |
|---|---|---|---|---|
| 2004/0076138 | A1* | 4/2004 | Serceki | ............... H04L 1/20 370/349 |
| 2005/0157676 | A1* | 7/2005 | Kwak | ............... H04W 28/14 370/328 |
| 2011/0320588 | A1* | 12/2011 | Raleigh | ............... H04W 36/245 709/224 |
| 2013/0201842 | A1 | 8/2013 | Chou et al. | |
| 2014/0098671 | A1* | 4/2014 | Raleigh | ............... H04M 15/80 370/235 |
| 2014/0200004 | A1 | 7/2014 | Wegmann et al. | |
| 2015/0078344 | A1 | 3/2015 | Futaki et al. | |

FOREIGN PATENT DOCUMENTS

| | | |
|---|---|---|
| CN | 101547477 A | 9/2009 |
| CN | 103220699 A | 7/2013 |
| CN | 103313333 A | 9/2013 |
| CN | 103369565 A | 10/2013 |
| EP | 2426978 A1 | 3/2012 |
| JP | WO2013136811 A1 | 9/2013 |
| WO | 2013020584 A1 | 2/2013 |
| WO | 2013137802 A2 | 9/2013 |

OTHER PUBLICATIONS

Partial Supplementary European Search Report dated Jun. 6, 2017 re: Application No. 15824302.2-1854 / 3174330; pp. 1-16.
Supplemental European Search Report dated Sep. 29, 2017 re: Application No. 15824302.2-1854 / 3174330; pp. 1-20.

* cited by examiner

OPTIMIZED PROCESSING METHOD AND APPARATUS FOR TERMINAL SERVICE MIGRATION

TECHNICAL FIELD

The present disclosure relates to the field of communications, and in particular to an optimized processing method and apparatus for service migration of a terminal.

BACKGROUND

With the rapid increase of the number of smart terminal users and the volume of user voice data services, a mobile communication operator needs to continuously expand the deployment scale of its mobile communication network, and correspondingly updates a network thereof according to continuous evolution of radio communication technologies and protocol standards, in order to obtain a better radio coverage performance and to continuously improve the system capacity. In order to protect existing investments, network evolution of operators will usually have a longer transition period, within which multiple radio communication access technologies co-exist in a network of a single operator. For example, China Mobile and China Unicom in the Asia as well as most of mobile communication operators in the Europe sequentially deploy three radio communication access technologies, namely a Global system for Mobile Communication (GSM), a Universal Mobile Telecommunications System (UMTS), and Long-Term Evolution (LTE) in a $3^{rd}$ Generation Partnership Project (3GPP) communication standard organization, and also widely deploy a Wireless Local Area Network (WLAN) system in an IEEE communication standard organization, for service distribution. For another example, the China Mobile also deploys a Code Division Multiple Access (CDMA) in a 3GPP2 communication standard organization, LTE (4G) in the 3GPP communication standard organization, and the WLAN system.

Under a scenario where multiple radio communication access technologies co-exist in the network of a single operator, a service migration process of terminals or service transmission between the terminals and the network (the service transmission may also serve as a node of the service migration process of the terminals, that is, the service transmission may be regarded as a starting point or an ending point of service migration) becomes more complicated. There may exist not only the switching in the same system (e.g., switching between different base stations in the LTE, and switching between different base stations in the UTMS), but also the switching/reorientation between different radio communication access technologies (e.g., switching between LTE and 3G) and traffic migration between a 3GPP radio communication access technology and the WLAN (e.g., service distribution from LTE or 3G to the WLAN).

Under the above-mentioned complicated service migration scenario, in a process that a terminal moves from a source side to a target side, radio link and network situations of the target side may be greatly different from those of the source side, which may be caused by the difference between different radio communication access technologies. For example, a 2G/3G network and a 4G network are greatly different in peak rate and sector throughput. The difference may also be caused by network running situations. For example, the source side is light in load, and the target side is heavy in load, or otherwise. The difference will directly cause that the service performance is greatly changed after a user moves to the target side, which results in great change of the user experience. A service migration process in which the user experience goes bad or severely bad should be avoided to the greatest extent. On the contrary, a service migration process capable of making the user experience better should be more triggered, which requires that a triggering node of the service migration process can acquire sufficient statistical change information of service performance or user experience after the user service migration.

The service migration process of a terminal mainly has two control modes, namely a terminal control mode and a network control mode. In the terminal control mode, the terminal is a core node for searching and processing information and triggering and ending the service migration process. Therefore, information statistics can be easily made, and the service migration process can be autonomously optimized at the terminal.

In the network control mode of the service migration process, the source side is usually a triggering node of the service migration process, and the target side is an ending node of the service migration process. However, a direct interface may not exist between the source side and the target side or an interface having a limited information transfer capability exists between the source side and the target side, so the source side is unlikely to acquire service performance or user experience related information after the user service migration. As a result, the service migration process (including optimization of service migration control parameters or a service migration control algorithm) cannot be optimized in time, and an identical set of inappropriate service migration control parameters or service migration control policy is used within a long time, thereby making the user experience continuously deteriorated.

There have been some solutions at present to allow the target side to transfer parameters to the source side in the service migration process of a terminal. But these parameters are usually state parameters of the target side such as load information of the target side, a radio resource situation, a return link bandwidth, routing information and the like. However, these parameters cannot directly reflect actual service performance or service experience in the user service migration process, and usually can only be used for estimating or predicting the user service satisfaction of the target side.

An effective solution is not proposed yet for the above-mentioned problem in the related art.

SUMMARY

Embodiments of the present disclosure provide an optimized processing method and apparatus for service migration of a terminal, which can at least solve the technical problem in the related art that the service performance or service experience, etc. of a terminal is not taken into account during service transmission between a terminal and a network or during service migration of a terminal.

According to an embodiment of the present disclosure, an optimized processing method is provided, which may include that: when the terminal conducts service transmission with a network or when the terminal performs service migration between a source network element and a target network element, service performance information of the terminal is acquired.

In the embodiment of the present disclosure, acquiring the service performance information of the terminal may include one of: acquiring, by the terminal, the service performance information; acquiring, by the target network element, the service performance information; and acquiring, by the source network element, the service performance information.

In the embodiment of the present disclosure, the service performance information may include at least one of:

a forward service rate and/or a reverse service rate actually obtained on a specified statistical granularity within a preset statistical time;

a change rate of the forward service rate and/or a change rate of the reverse service rate on a specified statistical granularity within a preset statistical time;

a forward service transmission delay and/or a reverse service transmission delay on a specified statistical granularity within a preset statistical time;

a change rate of the forward service transmission delay and/or a change rate of the reverse service transmission delay on a specified statistical granularity within a preset statistical time;

at least one of the following information on a specified statistical granularity within a preset statistical time: a forward packet error rate, a reverse packet error rate, a forward packet loss rate, a reverse packet loss rate, and a service transmission interruption duration;

at least one of the following information on a specified statistical granularity within a preset statistical time: a forward service throughput, a reverse service throughput, a change rate of the forward service throughput, and a change rate of the reverse service throughput; and a service performance change indicator.

In the embodiment of the present disclosure, the service performance change indicator may include at least one of: a service performance deterioration indicator and a service performance improvement indicator.

In the embodiment of the present disclosure, the forward service rate and/or the reverse service rate may include one of: a maximum service rate value of the forward service rate and/or the reverse service rate within the preset statistical time; an effective average value M of the forward service rate and/or the reverse service rate, wherein M=S/T, where S represents a total amount of services transmitted within the preset statistical time, and T represents a transmission duration; and a statistical average value N of the forward service rate and/or the reverse service rate within the preset statistical time, wherein N=S/T1, where S represents a total amount of services transmitted within the preset statistical time, and T1 represents a statistical duration.

In the embodiment of the present disclosure, the change rate of the forward service rate may be acquired by means of one of the following modes:

change rate of forward service rate=(forward service rate after service migration-forward service rate before service migration)/forward service rate before service migration*100%; and change rate of forward service rate=(forward service rate after service migration-configured service rate threshold)/configured service rate threshold*100%;

or, the change rate of the reverse service rate may be acquired by means of one of the following modes:

change rate of reverse service rate=(reverse service rate after service migration-reverse service rate before service migration)/reverse service rate before service migration*100%; and change rate of reverse service rate=(reverse service rate after service migration-configured service rate threshold)/configured service rate threshold*100%.

In the embodiment of the present disclosure, the forward service transmission delay and/or the reverse service transmission delay may include one of: a maximum value of the forward service transmission delay or the reverse service transmission delay, measured within the preset statistical time; and an average value of the forward service transmission delay or the reverse service transmission delay, which is equal to a ratio of a sum of transmission delays of each unit service within a statistical time to a total number of service units.

In the embodiment of the present disclosure, the change rate of the forward service transmission delay may be acquired by means of one of the following modes:

change rate of forward service transmission delay=(forward service transmission delay after service migration-configured delay threshold)/configured delay threshold*100%; and change rate of reverse service transmission delay=(reverse service transmission delay after service migration-reverse service transmission delay before service migration)/reverse service transmission delay before service migration*100%;

and/or, the change rate of the reverse service transmission delay may be acquired by means of the following mode:

change rate of reverse service transmission delay=(reverse service transmission delay after service migration-configured delay threshold)/configured delay threshold*100%.

In the embodiment of the present disclosure, the forward packet error rate or the forward packet loss rate may be acquired by means of the following mode:

forward packet error rate or forward packet loss rate=(number of error forward packets or number of lost forward packets)/total number of forward service data packets*100%;

and/or, the reverse packet error rate or the reverse packet loss rate may be acquired by means of the following mode:

reverse packet error rate or reverse packet loss rate=(number of error reverse packets or number of lost reverse packets)/total number of reverse service data packets*100%.

In the embodiment of the present disclosure, the forward service throughput may be a total amount of services forwardly transmitted within a statistical time; and/or, the reverse service throughput may be a total amount of services reversely transmitted within a statistical time; and/or, change rate of forward service throughput=(forward service throughput after service migration-forward service throughput before service migration)/forward service throughput before service migration*100%; and/or change rate of forward service throughput=(forward service throughput after service migration-configured service throughput threshold)/configured service throughput threshold*100%; and/or change rate of reverse service throughput=(reverse service throughput after service migration-reverse service throughput before service migration)/reverse service throughput before service migration*100%; and/or change rate of reverse service throughput=(reverse service throughput after service migration-configured service throughput threshold)/configured service throughput threshold*100%.

In the embodiment of the present disclosure, the specified statistical granularity may include: one or more terminals; and/or, at least one of the following information for a terminal: an Access Point Name (APN), an Internet Protocol (IP) stream, a bearer, a service, and an application.

In the embodiment of the present disclosure, the method may further include that: when the service performance information satisfies at least one of the following conditions, it is determined that service migration of the terminal to the target network element meets a preset requirement, and otherwise, it is determined that the service migration of the terminal to the target network element does not meet the preset requirement:

the change rate of the forward service rate and/or the change rate of the reverse service rate is a positive value; or, the change rate of the forward service rate and/or the change rate of the reverse service rate is a positive value, and an absolute difference value between the change rate of the forward service rate and/or the change rate of the reverse service rate and a first threshold value is greater than a first specified value; or, the change rate of the forward service transmission delay and/or the change rate of the reverse service transmission delay is a negative value; or, the change rate of the forward service transmission delay and/or the change rate of the reverse service transmission delay is a negative value, and an absolute difference value between the change rate of the forward service transmission delay and/or the change rate of the reverse service transmission delay and a second threshold value is greater than a second specified value;

the forward packet error rate or the reverse packet error rate is smaller than a third threshold value;

the forward packet loss rate or the reverse packet loss rate is smaller than a fourth threshold value;

the service transmission interruption duration is smaller than a fifth threshold value; the change rate of the forward service throughput or the change rate of the reverse service throughput is a positive value;

the change rate of the forward service throughput or the change rate of the reverse service throughput is a positive value, and an absolute difference value between the change rate of the forward service throughput and/or the change rate of the reverse service throughput and a sixth threshold value is greater than a third specified value; and the service performance change indicator indicates service performance improvement.

According to another embodiment of the present disclosure, a method for transferring service performance information of a terminal is provided, which may include that: when the terminal conducts service transmission with a network or when the terminal performs service migration between a source network element and a target network element, service performance information of the terminal is acquired; and the service performance information is reported to a network element at a network side.

In the embodiment of the present disclosure, the service performance information may include at least one of:

a forward service rate and/or a reverse service rate actually obtained on a specified statistical granularity within a preset statistical time;

a change rate of the forward service rate and/or a change rate of the reverse service rate on a specified statistical granularity within a preset statistical time;

a forward service transmission delay and/or a reverse service transmission delay on a specified statistical granularity within a preset statistical time;

a change rate of the forward service transmission delay and/or a change rate of the reverse service transmission delay on a specified statistical granularity within a preset statistical time;

at least one of the following information on a specified statistical granularity within a preset statistical time: a forward packet error rate, a reverse packet error rate, a forward packet loss rate, a reverse packet loss rate, and a service transmission interruption duration;

at least one of the following information on a specified statistical granularity within a preset statistical time: a forward service throughput, a reverse service throughput, a change rate of the forward service throughput, and a change rate of the reverse service throughput; and a service performance change indicator.

In the embodiment of the present disclosure, the step that the service performance information is reported to the network element at the network side may include one of the following steps.

When the network element at the network side is the source network element, the terminal or the target network element reports the service performance information to the network element at the network side; or, the terminal sends the service performance information acquired by the terminal to the target network element, and then the target network element reports the service performance information to the network element at the network side.

When the network element at the network side is the target network element, the source network element or the terminal reports the service performance information to the network element at the network side.

When the network element at the network side is a third-party network element, the service performance information is directly or indirectly reported to the network element at the network side by one of: the source network element, the target network element, and the terminal.

In the embodiment of the present disclosure, the step that the service performance information is indirectly reported may include one of the following steps.

The source network element reports the service performance information to the third-party network element via the target network element.

The terminal reports the service performance information to the third-party network element via the source network element.

The terminal reports the service performance information to the third-party network element via the target network element.

The target network element reports the service performance information to the third-party network element via the source network element.

In the embodiment of the present disclosure, before the service performance information is reported to the network element at the network side, the method may include one of the following steps.

Reporting of the service performance information is triggered when the service performance information is acquired.

Reporting of the service performance information is triggered based on an event or a request.

According to a further embodiment of the present disclosure, a statistical method for service performance information of a terminal is provided, which may include that: when the terminal conducts service transmission with a network or when the terminal performs service migration between a source network element and a target network element, service performance information of the terminal is acquired;

and statistics of the service performance information on a specified statistical granularity are collected.

In the embodiment of the present disclosure, the service performance information may include at least one of:

a forward service rate and/or a reverse service rate actually obtained on a specified statistical granularity within a preset statistical time;

a change rate of the forward service rate and/or a change rate of the reverse service rate on a specified statistical granularity within a preset statistical time;

a forward service transmission delay and/or a reverse service transmission delay on a specified statistical granularity within a preset statistical time;

a change rate of the forward service transmission delay and/or a change rate of the reverse service transmission delay on a specified statistical granularity within a preset statistical time;

at least one of the following information on a specified statistical granularity within a preset statistical time: a forward packet error rate, a reverse packet error rate, a forward packet loss rate, a reverse packet loss rate, and a service transmission interruption duration;

at least one of the following information on a specified statistical granularity within a preset statistical time: a forward service throughput, a reverse service throughput, a change rate of the forward service throughput, and a change rate of the reverse service throughput; and a service performance change indicator.

In the embodiment of the present disclosure, the method may further include that: the acquired service performance information or a statistical result of the service performance information is matched with network state information of the target network element and/or the source network element.

In the embodiment of the present disclosure, the network state information may include at least one of: a signal strength during triggering of the service migration, a load situation during triggering of the service migration, an uplink/downlink condition during triggering of the service migration, an average signal strength within a preset statistical time period, an average load situation within the preset statistical time period, and an average uplink/downlink condition within the preset statistical time period.

In the embodiment of the present disclosure, the method may further include that: when the service performance information satisfies at least one of the following conditions, it is determined that service migration of the terminal to the target network element meets a preset requirement, and otherwise, it is determined that the service migration of the terminal to the target network element does not meet the preset requirement:

the change rate of the forward service rate and/or the change rate of the reverse service rate is a positive value; or, the change rate of the forward service rate and/or the change rate of the reverse service rate is a positive value, and an absolute difference value between the change rate of the forward service rate and/or the change rate of the reverse service rate and a first threshold value is greater than a first specified value; or, the change rate of the forward service transmission delay and/or the change rate of the reverse service transmission delay is a negative value; or, the change rate of the forward service transmission delay and/or the change rate of the reverse service transmission delay is a negative value, and an absolute difference value between the change rate of the forward service transmission delay and/or the change rate of the reverse service transmission delay and a second threshold value is greater than a second specified value;

the forward packet error rate or the reverse packet error rate is smaller than a third threshold value;

the forward packet loss rate or the reverse packet loss rate is smaller than a fourth threshold value;

the service transmission interruption duration is smaller than a fifth threshold value; the change rate of the forward service throughput or the change rate of the reverse service throughput is a positive value;

the change rate of the forward service throughput or the change rate of the reverse service throughput is a positive value, and an absolute difference value between the change rate of the forward service throughput and/or the change rate of the reverse service throughput and a sixth threshold value is greater than a third specified value; and the service performance change indicator indicates service performance improvement.

According to a further embodiment of the present disclosure, a performance optimization method for service migration of a terminal is provided, which may include that: a network element at a network side receives service performance information, wherein the service performance information is service performance information in a process that a terminal conducts service transmission with a network or in a process that the terminal performs service migration between a source network element and a target network element; and the network element at the network side adjusts a service migration parameter and/or a service migration policy according to the service performance information or a statistical result of the service performance information on a specified statistical granularity.

In the embodiment of the present disclosure, the network element at the network side may receive the service performance information from one of: the terminal, the source network element and the target network element.

In the embodiment of the present disclosure, the service performance information may include at least one of:

a forward service rate and/or a reverse service rate actually obtained on a specified statistical granularity within a preset statistical time;

a change rate of the forward service rate and/or a change rate of the reverse service rate on a specified statistical granularity within a preset statistical time;

a forward service transmission delay and/or a reverse service transmission delay on a specified statistical granularity within a preset statistical time;

a change rate of the forward service transmission delay and/or a change rate of the reverse service transmission delay on a specified statistical granularity within a preset statistical time;

at least one of the following information on a specified statistical granularity within a preset statistical time: a forward packet error rate, a reverse packet error rate, a forward packet loss rate, a reverse packet loss rate, and a service transmission interruption duration;

at least one of the following information on a specified statistical granularity within a preset statistical time: a forward service throughput, a reverse service throughput, a change rate of the forward service throughput, and a change rate of the reverse service throughput; and a service performance change indicator.

In the embodiment of the present disclosure, the method may further include that: when the service performance information satisfies at least one of the following conditions, it is determined that the service migration of the terminal to the target network element meets a preset requirement, and otherwise, it is determined that the service migration of the terminal to the target network element does not meet the preset requirement:

the change rate of the forward service rate and/or the change rate of the reverse service rate is a positive value; or, the change rate of the forward service rate and/or the change rate of the reverse service rate is a positive value, and an absolute difference value between the change rate of the forward service rate and/or the change rate of the reverse service rate and a first threshold value is greater than a first specified value; or, the change rate of the forward service transmission delay and/or the change rate of the reverse service transmission delay is a negative value; or, the change rate of the forward service transmission delay and/or the change rate of the reverse service transmission delay is a negative value, and an absolute difference value between the change rate of the forward service transmission delay and/or the change rate of the reverse service transmission delay and a second threshold value is greater than a second specified value;

the forward packet error rate or the reverse packet error rate is smaller than a third threshold value;

the forward packet loss rate or the reverse packet loss rate is smaller than a fourth threshold value;

the service transmission interruption duration is smaller than a fifth threshold value; the change rate of the forward service throughput or the change rate of the reverse service throughput is a positive value;

the change rate of the forward service throughput or the change rate of the reverse service throughput is a positive value, and an absolute difference value between the change rate of the forward service throughput and/or the change rate of the reverse service throughput and a sixth threshold value is greater than a third specified value; and the service performance change indicator indicates service performance improvement.

In the embodiment of the present disclosure, the service migration parameter and/or the service migration policy may include: a service migration parameter and/or service migration policy of the terminal in a subsequent service migration process; and a service migration parameter and/or service migration policy of the source network element, the target network element or a third-party network element.

In the embodiment of the present disclosure, the service migration parameter may include one of: a seventh threshold value of a load situation of the source network element, an eighth threshold value of an uplink condition of the source network element, a ninth threshold value of a downlink condition of the source network element, a priority of the target network element, a tenth threshold value of a signal strength of the target network element, an eleventh threshold value of a load situation of the target network element, a twelfth threshold value of an uplink condition of the target network element, a thirteenth threshold value of a downlink condition of the target network element, and a fourteenth threshold value of a signal strength of the source network element.

In the embodiment of the present disclosure, the service migration policy may include: conducting service migration when one of the following conditions is satisfied:

the load situation of the source network element is greater than the seventh threshold value;

the uplink condition of the source network element is greater than the eighth threshold value;

the downlink condition of the source network element is greater than the ninth threshold value;

the signal strength of the target network element is greater than the tenth threshold value; the load situation of the target network element is greater than the eleventh threshold value;

the uplink condition of the target network element is greater than the twelfth threshold value;

the downlink condition of the target network element is greater than the thirteenth threshold value; and the signal strength of the source network element is greater than the fourteenth threshold value.

In the embodiment of the present disclosure, the specified statistical granularity may include: one or more terminals; and/or, at least one of the following information for a terminal: an APN, an IP stream, and a bearer.

In the embodiment of the present disclosure, the network element at the network side may include one of: the source network element, the target network element, and a third-party network element.

According to a further embodiment, an optimized processing apparatus for a terminal service is provided, which may include: a determination module, arranged to determine that a terminal conducts service transmission with a network or the terminal performs service migration between a source network element and a target network element; and an acquisition module, arranged to acquire service performance information of the terminal when a determination result of the determination module is positive.

In the embodiment of the present disclosure, the acquisition module may be arranged to acquire one of the following service performance information:

a forward service rate and/or a reverse service rate actually obtained on a specified statistical granularity within a preset statistical time;

a change rate of the forward service rate and/or a change rate of the reverse service rate on a specified statistical granularity within a preset statistical time;

a forward service transmission delay and/or a reverse service transmission delay on a specified statistical granularity within a preset statistical time;

a change rate of the forward service transmission delay and/or a change rate of the reverse service transmission delay on a specified statistical granularity within a preset statistical time;

at least one of the following information on a specified statistical granularity within a preset statistical time: a forward packet error rate, a reverse packet error rate, a forward packet loss rate, a reverse packet loss rate, and a service transmission interruption duration;

at least one of the following information on a specified statistical granularity within a preset statistical time: a forward service throughput, a reverse service throughput, a change rate of the forward service throughput, and a change rate of the reverse service throughput; and a service performance change indicator.

According to a further embodiment of the present disclosure, an apparatus for transferring service performance information of a terminal is provided, which may include: an acquisition module, arranged to acquire, when the terminal conducts service transmission with a network or when the terminal performs service migration between a source network element and a target network element, service performance information of the terminal; and a reporting module, arranged to report the service performance information to a network element at a network side.

According to a further embodiment of the present disclosure, a statistical apparatus for service performance information is provided, which may include: an acquisition module, arranged to acquire, when the terminal conducts service transmission with a network or when the terminal performs service migration between a source network element and a target network element, service performance information of the terminal; and a statistical module, arranged to collect statistics of the service performance information on a specified statistical granularity.

According to a further embodiment of the present disclosure, a performance optimization apparatus for service migration of a terminal is provided, which may be applied to a network element at a network side. The apparatus may include: a receiving module, arranged to receive service performance information, wherein the service performance information is service performance information in a process that a terminal conducts service transmission with a network or in a process that the terminal performs service migration between a source network element and a target network element; and an adjustment module, arranged to adjust a service migration parameter and/or a service migration policy according to the service performance information or a statistical result of the service performance information on a specified statistical granularity.

By means of the embodiments of the present disclosure, technical means of reporting service performance information of a terminal in a service migration process to a node at the network side is adopted, and the technical problem in the related art that the service performance or service experience, etc. of the terminal is not taken into account during service transmission between a terminal and a network or during service migration of a terminal is solved. The service performance and service experience can be obtained when the terminal conducts service transmission or service migration, thereby providing a powerful support for optimizing the service migration or service transmission of the terminal and improving the experience of a user.

BRIEF DESCRIPTION OF THE DRAWINGS

The accompanying drawings described herein are intended to provide further understanding of the present disclosure, and form a part of the present application. The schematic embodiments and descriptions of the present disclosure are intended to explain the present disclosure, and do not form improper limits to the present disclosure. In the accompanying drawings.

DETAILED DESCRIPTION OF THE EMBODIMENTS

The present disclosure will be described below with reference to the accompanying drawings and in conjunction with the embodiments in detail. It is important to note that the embodiments in the present application and the features in the embodiments may be combined under the condition of no conflicts.

Figure 1:
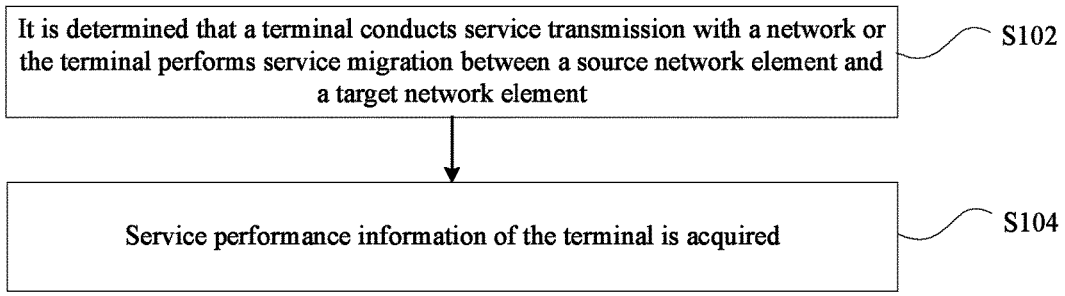
FIG. 1 is a flowchart of an optimized processing method for service migration of a terminal according to an embodiment of the present disclosure.

FIG. 1 is a flowchart of an optimized processing method for service migration of a terminal according to an embodiment of the present disclosure. As shown in FIG. 1, the method includes the following processing steps.

Step S102: It is determined that a terminal conducts service transmission with a network or the terminal performs service migration between a source network element and a target network element.

Step S104: Service performance information of the terminal is acquired.

By means of the above-mentioned processing steps, the performance information of the terminal during service transmission or service migration is acquired, and therefore the service performance information can be fully taken into account during the service transmission or service migration of the terminal, thereby providing a powerful support for optimizing the service migration or service transmission of the terminal and improving the experience of a user.

In an exemplary implementation process of the present embodiment, the network with which the terminal conducts service transmission may include, but is not limited to, a WLAN.

In the present embodiment, acquiring the service performance information of the terminal when the terminal conducts service transmission with the network may be understood as, but is limited to, acquiring, before or after service migration or in a service migration process, the service performance information in the service transmission process of the terminal with an LTE network and the WLAN.

Certainly, in an exemplary embodiment, Step S102 may be cancelled or replaced by using other implementation modes (e.g., using a technical way of monitoring or acquiring a service state of the terminal), as long as the service performance information of the terminal is acquired when the terminal conducts service transmission or when the terminal performs service migration between the source network element and the target network element.

In the present embodiment, an executive body of Step S104 may be the terminal, the source network element or the target network element. That is, in Step S104, the service performance information may be acquired by the terminal or the target network element or the source network element. In an exemplary implementation mode, the target network element may acquire the service performance information directly or indirectly. The indirect acquisition mode may be embodied as, but is not limited to, the following form: after the terminal acquires the service performance information, the terminal sends the service performance information acquired by the terminal to the target network element.

In the present embodiment, the service performance information may include, but is not limited to, at least one of:

(1) a forward service rate and/or a reverse service rate actually obtained on a specified statistical granularity within a preset statistical time, wherein in an exemplary implementation mode, the forward service rate and/or the reverse service rate may include one of:

a maximum service rate value of the forward service rate and/or the reverse service rate within the preset statistical time;

an effective average value M of the forward service rate and/or the reverse service rate, wherein M=S/T, where S represents a total amount of services transmitted within the preset statistical time, and T represents a transmission duration; and a statistical average value N of the forward service rate and/or the reverse service rate within the preset statistical time, wherein N=S/T1, where S represents a total amount of services transmitted within the preset statistical time, and T1 represents a statistical duration.

(2) a change rate of the forward service rate and/or a change rate of the reverse service rate on a specified statistical granularity within a preset statistical time, wherein in an exemplary implementation mode of the present embodiment, the change rate of the forward service rate is acquired by means of one of the following modes:

change rate of forward service rate A=(forward service rate after service migration-forward service rate before service migration)/forward service rate before service migration*100%, wherein '*' in the present embodiment represents a multiplication symbol in mathematical operators; and change rate of forward service rate=(forward service rate after service migration-configured service rate threshold)/configured service rate threshold*100%;

or, the change rate of the reverse service rate is acquired by means of one of the following modes:

change rate of reverse service rate=(reverse service rate after service migration-reverse service rate before service migration)/reverse service rate before service migration*100%; and change rate of reverse service rate=(reverse service rate after service migration-configured service rate threshold)/configured service rate threshold*100%.

(3) a forward service transmission delay and/or a reverse service transmission delay on a specified statistical granularity within a preset statistical time, wherein in an exemplary implementation mode, the forward service transmission delay and/or the reverse service transmission delay may include one of:

a maximum value of the forward service transmission delay or the reverse service transmission delay, measured within the preset statistical time; and an average value of the forward service transmission delay or the reverse service transmission delay, which is equal to a ratio of a sum of transmission delays of each unit service within a statistical time to a total number of service units, wherein for example, a service statistical unit is IP packet, N IP packets are transmitted within statistical time, and a transmission delay of the $i^{th}$ IP packet is Di, so an average value of a service transmission delay obtained by the current statistics is equal to $$\sum_i Di/N.$$

(4) a change rate of the forward service transmission delay and/or a change rate of the reverse service transmission delay on a specified statistical granularity within a preset statistical time, wherein in an exemplary implementation mode, the change rate of the forward service transmission delay is acquired by means of one of the following modes:

change rate of forward service transmission delay=(forward service transmission delay after service migration-configured delay threshold)/configured delay threshold*100%; and change rate of reverse service transmission delay=(reverse service transmission delay after service migration-reverse service transmission delay before service migration)/reverse service transmission delay before service migration*100%;

and/or, the change rate of the reverse service transmission delay is acquired by means of the following mode:

change rate of reverse service transmission delay=(reverse service transmission delay after service migration-configured delay threshold)/configured delay threshold*100%.

(5) at least one of the following information on a specified statistical granularity within a preset statistical time: a forward packet error rate, a reverse packet error rate, a forward packet loss rate, a reverse packet loss rate, and a service transmission interruption duration, wherein in an exemplary implementation mode, the forward packet error rate or the forward packet loss rate may be acquired by means of the following mode:

forward packet error rate or forward packet loss rate=(number of error forward packets or number of lost forward packets)/total number of forward service data packets*100%;

and/or, the reverse packet error rate or the reverse packet loss rate may be acquired by means of the following mode:

reverse packet error rate or reverse packet loss rate=(number of error reverse packets or number of lost reverse packets)/total number of reverse service data packets*100%.

(6) at least one of the following information on a specified statistical granularity within a preset statistical time: a forward service throughput, a reverse service throughput, a change rate of the forward service throughput, and a change rate of the reverse service throughput, wherein in an exemplary implementation mode, the parameter information may be determined by means of the following modes:

the forward service throughput is a total amount of services forwardly transmitted within a statistical time; and/or, the reverse service throughput is a total amount of services reversely transmitted within a statistical time; and/or, change rate of forward service throughput=(forward service throughput after service migration-forward service throughput before service migration)/forward service throughput before service migration*100%; and/or change rate of forward service throughput=(forward service throughput after service migration-configured service throughput threshold)/configured service throughput threshold*100%; and/or change rate of reverse service throughput=(reverse service throughput after service migration-reverse service throughput before service migration)/reverse service throughput before service migration*100%; and/or change rate of reverse service throughput=(reverse service throughput after service migration-configured service throughput threshold)/configured service throughput threshold*100%; and (7) a service performance change indicator, wherein in the embodiment of the present disclosure, the service performance change indicator may include at least one of: a service performance deterioration indicator and a service performance improvement indicator.

In the present embodiment, the specified statistical granularity may include, but is not limited to, one of:

(1) one or more terminals; and (2) at least one of the following information for a terminal: an APN, an IP stream, a bearer, a service, and an application.

After the performance information is acquired by means of Step S104, statistical analysis may be made on the basis of the acquired performance information to adjust a service migration policy or a judgement migration effect, but it is not limited thereto. The migration effect may be determined by means of, but not limited to, the following mode.

When the service performance information satisfies at least one of the following conditions, it is determined that service migration of the terminal to the target network element meets a preset requirement, and otherwise, it is determined that the service migration of the terminal to the target network element does not meet the preset requirement:

the change rate of the forward service rate and/or the change rate of the reverse service rate is a positive value; or, the change rate of the forward service rate and/or the change rate of the reverse service rate is a positive value, and an absolute difference value between the change rate of the forward service rate and/or the change rate of the reverse service rate and a first threshold value is greater than a first specified value; or, the change rate of the forward service transmission delay and/or the change rate of the reverse service transmission delay is a negative value; or, the change rate of the forward service transmission delay and/or the change rate of the reverse service transmission delay is a negative value, and an absolute difference value between the change rate of the forward service transmission delay and/or the change rate of the reverse service transmission delay and a second threshold value is greater than a second specified value;

the forward packet error rate or the reverse packet error rate is smaller than a third threshold value;

the forward packet loss rate or the reverse packet loss rate is smaller than a fourth threshold value;

the service transmission interruption duration is smaller than a fifth threshold value; the change rate of the forward service throughput or the change rate of the reverse service throughput is a positive value;

the change rate of the forward service throughput or the change rate of the reverse service throughput is a positive value, and an absolute difference value between the change rate of the forward service throughput and/or the change rate of the reverse service throughput and a sixth threshold value is greater than a third specified value; and the service performance change indicator indicates service performance improvement.

Figure 2:
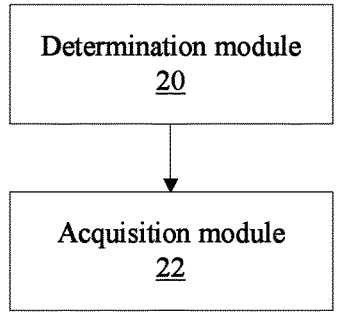
FIG. 2 is a structural block diagram of an optimized processing apparatus for service migration of a terminal according to an embodiment of the present disclosure.

In the present embodiment, an optimized processing apparatus for a terminal service is provided to implement the above-mentioned optimized processing method. As shown in FIG. 2, the apparatus includes:

a determination module 20, arranged to determine that a terminal conducts service transmission with a network or the terminal performs service migration between a source network element and a target network element; and an acquisition module 22, coupled to the determination module 20, and arranged to acquire service performance information of the terminal when a determination result of the determination module is positive.

In an exemplary implementation mode of the present embodiment, the acquisition module 22 is arranged to acquire one of the following service performance information:

a forward service rate and/or a reverse service rate actually obtained on a specified statistical granularity within a preset statistical time;

a change rate of the forward service rate and/or a change rate of the reverse service rate on a specified statistical granularity within a preset statistical time;

a forward service transmission delay and/or a reverse service transmission delay on a specified statistical granularity within a preset statistical time;

a change rate of the forward service transmission delay and/or a change rate of the reverse service transmission delay on a specified statistical granularity within a preset statistical time;

at least one of the following information on a specified statistical granularity within a preset statistical time: a forward packet error rate, a reverse packet error rate, a forward packet loss rate, a reverse packet loss rate, and a service transmission interruption duration;

at least one of the following information on a specified statistical granularity within a preset statistical time: a forward service throughput, a reverse service throughput, a change rate of the forward service throughput, and a change rate of the reverse service throughput; and a service performance change indicator.

It is important to note that each of the above-mentioned modules involved in the present embodiment may be implemented by software or hardware. An exemplary implementation mode of the hardware implementation is described as follows. The determination module 20 is located in a first processor, and the acquisition module 22 is located in a second processor. Or, both the determination module 20 and the acquisition module 22 are located in the same processor, but it is not limited thereto.

In order to effectively utilize the service performance information of the terminal, in the following embodiment, an optimization method for transfer and statistics collection of service performance information and service migration based on the transfer or statistics collection is also provided.

1. Transfer of Service Performance Information

Figure 3:
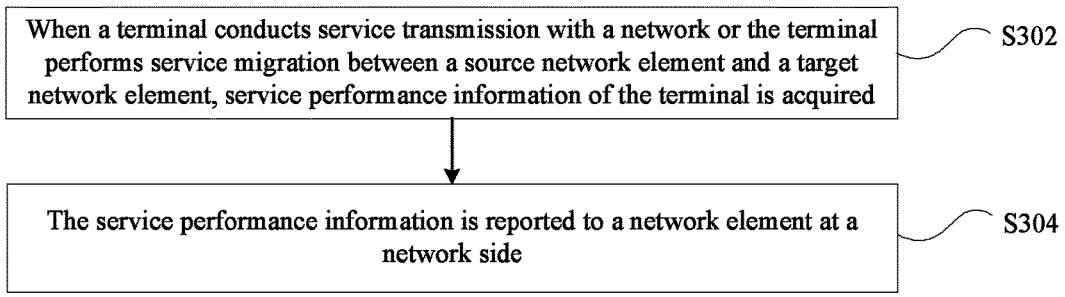
FIG. 3 is a flowchart of a method for transferring service performance information of a terminal according to an embodiment of the present disclosure.

The present embodiment provides a method for transferring service performance information of a terminal, so as to send the service performance information to a related network element, which then processes the service performance information. As shown in FIG. 3, the method includes the following steps.

Step S302: When a terminal conducts service transmission with a network or when the terminal performs service migration between a source network element and a target network element, service performance information of the terminal is acquired.

Step S304: The service performance information is reported to a network element at a network side.

By means of Step S302 to Step S304, reporting of the service performance information of the terminal is implemented, thereby providing a powerful support for optimizing the service transmission of a network element after service migration.

The service performance information may include at least one of:

a forward service rate and/or a reverse service rate actually obtained on a specified statistical granularity within a preset statistical time;

a change rate of the forward service rate and/or a change rate of the reverse service rate on a specified statistical granularity within a preset statistical time;

a forward service transmission delay and/or a reverse service transmission delay on a specified statistical granularity within a preset statistical time;

a change rate of the forward service transmission delay and/or a change rate of the reverse service transmission delay on a specified statistical granularity within a preset statistical time;

at least one of the following information on a specified statistical granularity within a preset statistical time: a forward packet error rate, a reverse packet error rate, a forward packet loss rate, a reverse packet loss rate, and a service transmission interruption duration;

at least one of the following information on a specified statistical granularity within a preset statistical time: a forward service throughput, a reverse service throughput, a change rate of the forward service throughput, and a change rate of the reverse service throughput; and a service performance change indicator.

There are many implementation modes of Step S304. For example, Step S304 may be implemented by means of one of the following modes, but it is not limited thereto.

(1) When the network element at the network side is the source network element, the terminal or the target network element reports the service performance information to the network element at the network side; or, the terminal sends the service performance information acquired by the terminal to the target network element, and then the target network element reports the service performance information to the network element at the network side.

(2) When the network element at the network side is the target network element, the source network element or the terminal reports the service performance information to the network element at the network side.

(3) When the network element at the network side is a third-party network element, the service performance information is directly or indirectly reported to the network element at the network side by one of: the source network element, the target network element, and the terminal. Indirect reporting to the third-party network element may be embodied as the following form, but it is not limited thereto.

The source network element reports the service performance information to the third-party network element via the target network element. The terminal reports the service performance information to the third-party network element via the source network element. The terminal reports the service performance information to the third-party network element via the target network element. The target network element reports the service performance information to the third-party network element via the source network element.

Step S304 may be triggered by means of a preset rule. For example, before the service performance information is reported to the network element at the network side, the following process may be executed to trigger reporting of the service performance information: triggering reporting of the service performance information when the service performance information is acquired; or, triggering reporting of the service performance information based on an event or a request.

Figure 4:
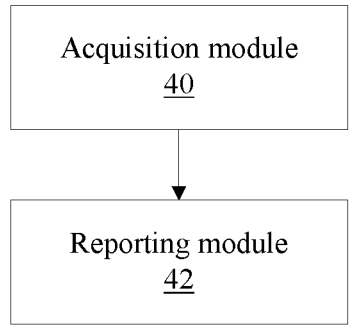
FIG. 4 is a structural block diagram of an apparatus for transferring service performance information of a terminal according to an embodiment of the present disclosure.

In the present embodiment, an apparatus for transferring service performance information of a terminal is also provided, so as to implement the above-mentioned method for transferring service performance information. As shown in FIG. 4, the apparatus includes:

an acquisition module 40, arranged to acquire, when the terminal conducts service transmission with a network or when the terminal performs service migration between a source network element and a target network element, service performance information of the terminal; and a reporting module 42, coupled to the acquisition module 40, and arranged to report the service performance information to a network element at a network side.

It is important to note that each of the above-mentioned modules involved in the present embodiment may be implemented by software or hardware. An exemplary implementation mode of the hardware implementation is described as follows. The acquisition module 40 is located in a first processor, and the reporting module 42 is located in a second processor. Or, both the acquisition module 40 and the reporting module 42 are located in the same processor, but it is not limited thereto.

2. Statistics of Service Performance Information

Figure 5:
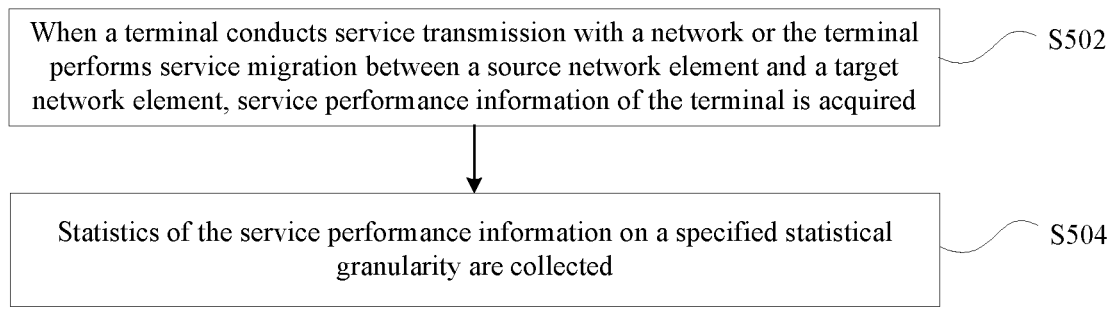
FIG. 5 is a flowchart of a statistical method for service performance information of a terminal according to an embodiment of the present disclosure.

FIG. 5 is a flowchart of a statistical method for service performance information of a terminal according to an embodiment of the present disclosure. As shown in FIG. 5, the method includes the following steps.

Step S502: When the terminal conducts service transmission with a network or when the terminal performs service migration between a source network element and a target network element, service performance information of the terminal is acquired.

Step S504: Statistics of the service performance information on a specified statistical granularity are collected.

By means of Step S502 to Step S504, statistics collection of the service performance information may be implemented, thereby providing a more powerful support for optimizing service transmission or service migration.

In an exemplary embodiment, the service performance information may include at least one of:

a forward service rate and/or a reverse service rate actually obtained on a specified statistical granularity within a preset statistical time;

a change rate of the forward service rate and/or a change rate of the reverse service rate on a specified statistical granularity within a preset statistical time;

a forward service transmission delay and/or a reverse service transmission delay on a specified statistical granularity within a preset statistical time;

a change rate of the forward service transmission delay and/or a change rate of the reverse service transmission delay on a specified statistical granularity within a preset statistical time;

at least one of the following information on a specified statistical granularity within a preset statistical time: a forward packet error rate, a reverse packet error rate, a forward packet loss rate, a reverse packet loss rate, and a service transmission interruption duration;

at least one of the following information on a specified statistical granularity within a preset statistical time: a forward service throughput, a reverse service throughput, a change rate of the forward service throughput, and a change rate of the reverse service throughput; and a service performance change indicator.

In order to make better use of the acquired service performance information or a statistical result of the service performance information, the statistical result or the acquired service performance information may be matched with network state information of the target network element and/or the source network element.

In an exemplary implementation mode, the network state information may include, but is not limited to, at least one of: a signal strength during triggering of the service migration, a load situation during triggering of the service migration, an uplink/downlink condition during triggering of the service migration, an average signal strength within a preset statistical time period, an average load situation within the preset statistical time period, and an average uplink/downlink condition within the preset statistical time period.

As an application of the service performance information, when the service performance information satisfies at least one of the following conditions, it is determined that service migration of the terminal to the target network element meets a preset requirement, and otherwise, it is determined that the service migration of the terminal to the target network element does not meet the preset requirement: the change rate of the forward service rate and/or the change rate of the reverse service rate is a positive value; or, the change rate of the forward service rate and/or the change rate of the reverse service rate is a positive value, and an absolute difference value between the change rate of the forward service rate and/or the change rate of the reverse service rate and a first threshold value is greater than a first specified value; or, the change rate of the forward service transmission delay and/or the change rate of the reverse service transmission delay is a negative value; or, the change rate of the forward service transmission delay and/or the change rate of the reverse service transmission delay is a negative value, and an absolute difference value between the change rate of the forward service transmission delay and/or the change rate of the reverse service transmission delay and a second threshold value is greater than a second specified value; the forward packet error rate or the reverse packet error rate is smaller than a third threshold value; the forward packet loss rate or the reverse packet loss rate is smaller than a fourth threshold value; the service transmission interruption duration is smaller than a fifth threshold value; the change rate of the forward service throughput or the change rate of the reverse service throughput is a positive value; the change rate of the forward service throughput or the change rate of the reverse service throughput is a positive value, and an absolute difference value between the change rate of the forward service throughput and/or the change rate of the reverse service throughput and a sixth threshold value is greater than a third specified value; and the service performance change indicator indicates service performance improvement.

Figure 6:
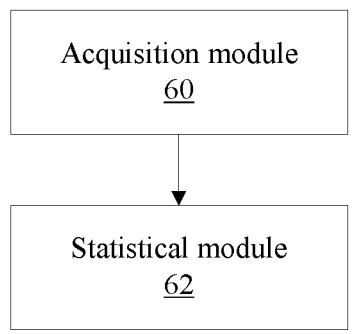
FIG. 6 is a structural block diagram of a statistical apparatus for service performance information of a terminal according to an embodiment of the present disclosure.

In the present embodiment, a statistical apparatus for service performance information is also provided, so as to implement the above-mentioned statistical method for service performance information. As shown in FIG. 6, the apparatus includes:

an acquisition module 60, arranged to acquire, when the terminal conducts service transmission with a network or when the terminal performs service migration between a source network element and a target network element, service performance information of the terminal; and a statistical module 62, coupled to the acquisition module 60, and arranged to collect statistics of the service performance information on a specified statistical granularity.

It is important to note that each of the above-mentioned modules involved in the present embodiment may be implemented by software or hardware. An exemplary implementation mode of the hardware implementation is described as follows. The acquisition module 60 is located in a first processor, and the statistical module 62 is located in a second processor. Or, both the acquisition module 60 and the statistical module 62 are located in the same processor, but it is not limited thereto.

3. Performance Optimization of Service Migration of a Terminal

Figure 7:
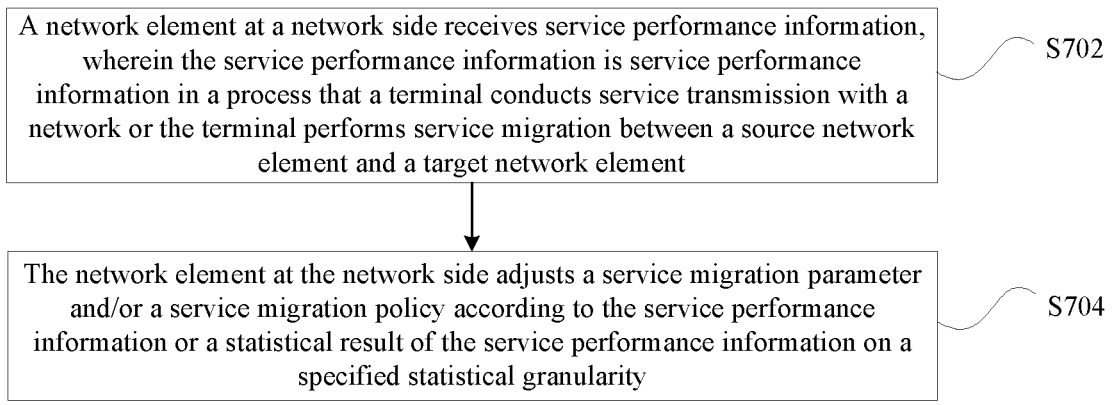
FIG. 7 is a flowchart of a performance optimization method for service migration of a terminal according to an embodiment of the present disclosure.

FIG. 7 is a flowchart of a performance optimization method for service migration of a terminal according to an embodiment of the present disclosure. As shown in FIG. 7, the method includes the following steps.

Step S702: A network element at a network side receives service performance information, wherein the service performance information is service performance information in a process that a terminal conducts service transmission with a network or in a process that the terminal performs service migration between a source network element and a target network element.

Step S704: The network element at the network side adjusts a service migration parameter and/or a service migration policy according to the service performance information or a statistical result of the service performance information on a specified statistical granularity.

By means of the above-mentioned processing steps, the service performance and service experience can be obtained when the terminal conducts service transmission or service migration, thereby optimizing the service migration or service transmission of the terminal and improving the experience of a user.

In the present embodiment, the network element at the network side receives the service performance information from one of: the terminal, the source network element and the target network element.

In an exemplary implementation mode of the present embodiment, the service performance information may include at least one of: a forward service rate and/or a reverse service rate actually obtained on a specified statistical granularity within a preset statistical time; a change rate of the forward service rate and/or a change rate of the reverse service rate on a specified statistical granularity within a preset statistical time; a forward service transmission delay and/or a reverse service transmission delay on a specified statistical granularity within a preset statistical time; a change rate of the forward service transmission delay and/or a change rate of the reverse service transmission delay on a specified statistical granularity within a preset statistical time; at least one of the following information on a specified statistical granularity within a preset statistical time: a forward packet error rate, a reverse packet error rate, a forward packet loss rate, a reverse packet loss rate, and a service transmission interruption duration; at least one of the following information on a specified statistical granularity within a preset statistical time: a forward service throughput, a reverse service throughput, a change rate of the forward service throughput, and a change rate of the reverse service throughput; and a service performance change indicator.

The service migration parameter and/or the service migration policy may include, but not limited to, a service migration parameter and/or service migration policy of the terminal in a subsequent service migration process; a service migration parameter and/or service migration policy of the source network element, the target network element or a third-party network element.

In an exemplary implementation mode of the present embodiment, the service migration parameter may include one of: a seventh threshold value of a load situation of the source network element, an eighth threshold value of an uplink condition of the source network element, a ninth threshold value of a downlink condition of the source network element, a priority of the target network element, a tenth threshold value of a signal strength of the target network element, an eleventh threshold value of a load situation of the target network element, a twelfth threshold value of an uplink condition of the target network element, a thirteenth threshold value of a downlink condition of the target network element, and a fourteenth threshold value of a signal strength of the source network element.

On the basis of the service migration parameter, the service migration policy may include: conducting service migration when one of the following conditions is satisfied:

the load situation of the source network element is greater than the seventh threshold value; the uplink condition of the source network element is greater than the eighth threshold value; the downlink condition of the source network element is greater than the ninth threshold value; the signal strength of the target network element is greater than the tenth threshold value; the load situation of the target network element is greater than the eleventh threshold value; the uplink condition of the target network element is greater than the twelfth threshold value; the downlink condition of the target network element is greater than the thirteenth threshold value; and the signal strength of the source network element is greater than the fourteenth threshold value.

In an exemplary implementation process, when the service performance information indicated by the statistical result satisfies at least one of the following conditions, it is determined that service migration of the terminal to the target network element meets a preset requirement, and otherwise, it is determined that the service migration of the terminal to the target network element does not meet the preset requirement:

the change rate of the forward service rate and/or the change rate of the reverse service rate is a positive value; or, the change rate of the forward service rate and/or the change rate of the reverse service rate is a positive value, and an absolute difference value between the change rate of the forward service rate and/or the change rate of the reverse service rate and a first threshold value is greater than a first specified value; or, the change rate of the forward service transmission delay and/or the change rate of the reverse service transmission delay is a negative value; or, the change rate of the forward service transmission delay and/or the change rate of the reverse service transmission delay is a negative value, and an absolute difference value between the change rate of the forward service transmission delay and/or the change rate of the reverse service transmission delay and a second threshold value is greater than a second specified value;

the forward packet error rate or the reverse packet error rate is smaller than a third threshold value;

the forward packet loss rate or the reverse packet loss rate is smaller than a fourth threshold value;

the service transmission interruption duration is smaller than a fifth threshold value; and the service performance change indicator indicates service performance improvement.

In the present embodiment, the specified statistical granularity may include: one or more terminals; and/or, at least one of the following information for a terminal: an APN, an IP stream, and a bearer.

In an exemplary implementation process of the present embodiment, the network element at the network side may include one of: the source network element, the target network element, and a third-party network element.

Figure 8:
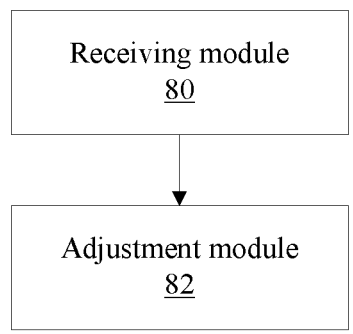
FIG. 8 is a structural block diagram of a performance optimization apparatus for service migration of a terminal according to an embodiment of the present disclosure.

In the present embodiment, a performance optimization apparatus for service migration of a terminal is also provided, which is applied to a network element at a network side. As shown in FIG. 8, the apparatus includes:

a receiving module 80, arranged to receive service performance information, wherein the service performance information is service performance information in a process that a terminal conducts service transmission with a network or in a process that the terminal performs service migration between a source network element and a target network element; and an adjustment module 82, coupled to the receiving module 80, and arranged to adjust a service migration parameter and/or a service migration policy according to the service performance information or a statistical result of the service performance information on a specified statistical granularity.

In order to better understand the above-mentioned embodiment, the above-mentioned embodiment is described below in conjunction with exemplary embodiments in detail.

Figure 9:
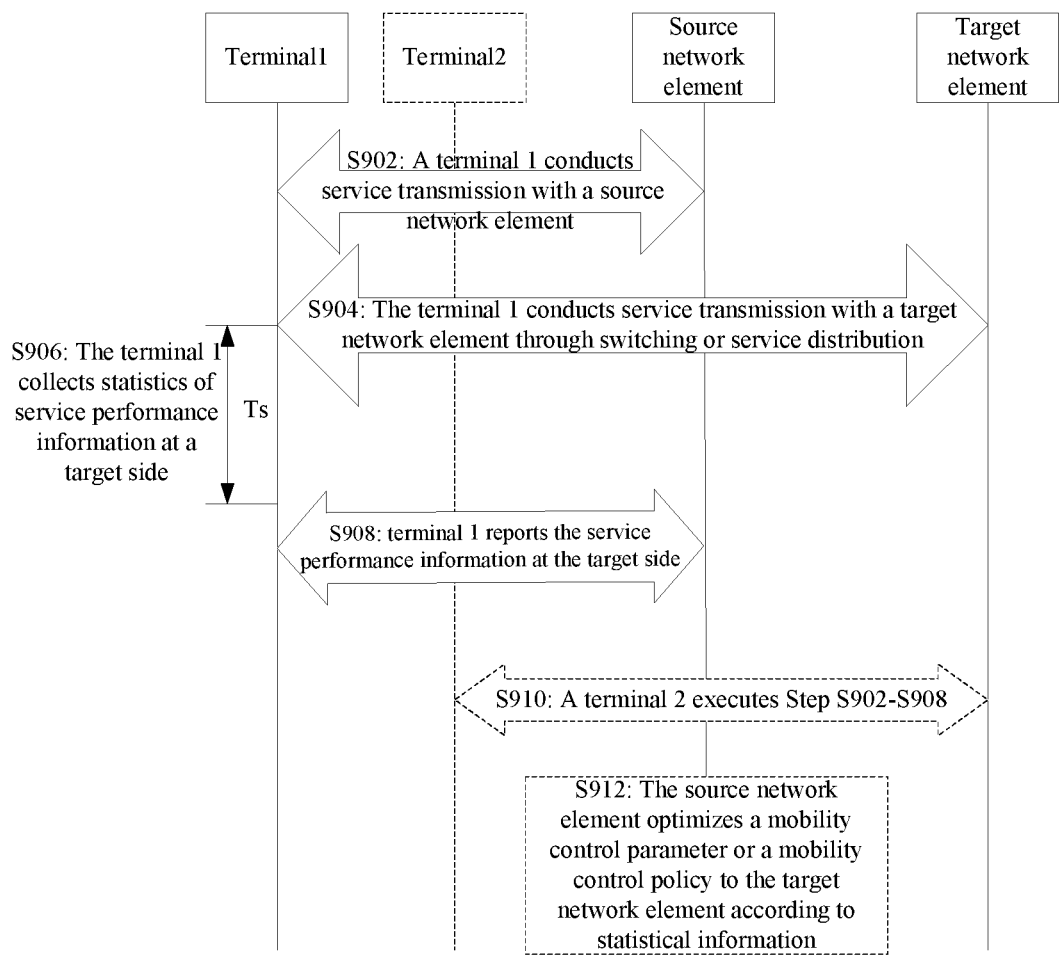
FIG. 9 is a schematic diagram of a flow of reporting, by a terminal, statistical information of service performance or user experience according to an embodiment 1 of the present disclosure.

FIG. 9 shows a flow of reporting, by a terminal, statistical information of service performance or user experience. As shown in FIG. 9, the flow includes the following processing steps.

Step S902: A terminal 1 establishes a connection with a source network element and conducts service transmission. The source network element may be an LTE base station, a 3G base station, a 2G base station, or a WLAN base station. For example, the source network element in the present embodiment is LTE eNB1; and in two services being executed by the terminal on the source network element, a service 1 is a service to APN1, and a service 2 is a service to APN2.

Step S904: The terminal 1 establishes a connection with a target network element, and all or some services are migrated to the target network element through switching or service distribution. The target network element may be an LTE base station, a 3G base station, a 2G base station, or a WLAN base station. For example, the target network element in the present embodiment is WLAN AP1. The terminal decides to distribute the service 2 on APN2 to the target network element.

Step S906: The terminal 1 collects statistics of service performance information obtained at the target network element on a certain statistical granularity within a period of time Ts, the service performance information including one or a combination of the following parameters: a forward service rate, a reverse service rate, a forward service transmission delay, and a reverse service transmission delay. For example, the terminal 1 collects statistics to obtain that a maximum forward service rate value of the service 2 on the target network element within 10 s is 600 kbps and an average value thereof is 400 kbps.

Step S908: The terminal 1 reports the service performance information obtained by statistics to a network. One of the following modes may be adopted.

a. The terminal 1 reports the service performance information obtained by statistics to the source network element.

b. The terminal 1 reports the service performance information obtained by statistics to a target side, and then the target side transfers the information to a source side via a direct interface or an indirect interface.

Further, the terminal 1 may cache current statistical data, which is marked as a statistical data set 1. The terminal 1 may report this statistical data set 1 to the network when statistical time is up. The terminal 1 may also cache this statistical data set 1, and then collect statistics at a time interval. When the network sends a statistical data reporting request to the terminal subsequently, the terminal replies by reporting the statistical data, e.g., by reporting latest N (e.g., N=1, 2, 3, . . . ) statistical data sets to the network. The statistical data set may be organized in the following manner as shown in Table 1-1.

TABLE 1-1

| | |
|---|---|
| Statistical count N | 1 |
| Terminal identifier | UE1 |
| Service identifier | Service 2 (or APN2) |
| Target network element identifier | AP1 |
| Maximum forward service rate value (target network element) | 600 kbps |

Step S910: A terminal 2 executes operations similar to the operations of the terminal 1. That is, the terminal 2 executes Step S902-S908.

Step S912: The source network element searches for service performance information reported by a plurality of terminals and obtained on the target network element. As shown in Table 1-2, the information is used for adjusting a service migration parameter or a service migration policy of a subsequent user for the target network element. For example, the source network element obtains a distribution performance of a service 2 on the target network element AP1, as shown in the following table, from a plurality of terminals. It may be considered that a more stable service experience regarding the present service can be obtained on the target network element AP1, so the source network element may directly improve the switching or distributing priority of the target network element AP1, or indirectly improve the switching or distributing priority of the target network element AP1 by appropriately reducing a signal strength threshold of the target network element AP1, so that services 2 of other subsequent terminals may be preferentially distributed to AP1 with a higher probability.

TABLE 1-2

| | | | |
|---|---|---|---|
| Terminal identifier | UE1 | UE2 | . . . |
| Service identifier | Service 2 (or APN2) | Service 2 (or APN2) | . . . |
| Target network element identifier | AP1 | AP1 | . . . |
| Maximum forward service rate value (target network element) | 600 kbps | 550 kbps | . . . |

Embodiment 2

Figure 10:
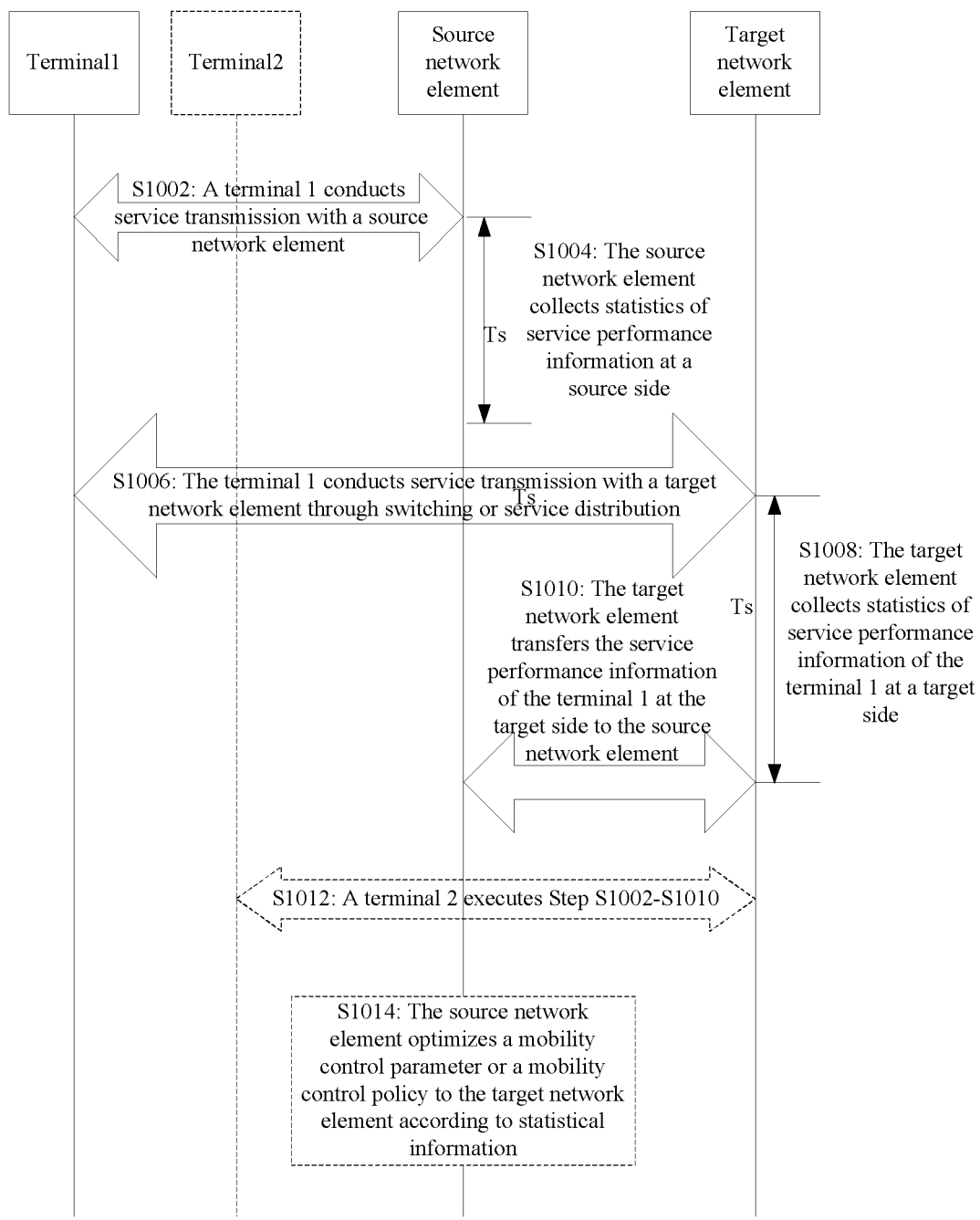
FIG. 10 is a schematic diagram of a flow of transferring statistical information of service performance or user experience between network elements according to an embodiment 2 of the present disclosure.

FIG. 10 shows a flow of transferring service performance/user experience statistical information between network elements. As shown in FIG. 10, the flow includes the following processing steps.

Step S1002: A terminal 1 establishes a connection with a source network element and conducts service transmission. The source network element may be an LTE base station, a 3G base station, a 2G base station, or a WLAN base station. For example, the source network element in the present embodiment is LTE eNB1; and in two services being executed by the terminal on the source network element, a service 1 is a service to APN1, and a service 2 is a service to APN2.

Step S1004: The source network element collects statistics of service performance information obtained at the source network element on a certain statistical granularity within a period of time Ts, the service performance information including one or a combination of the following parameters: a forward service rate, a reverse service rate, a forward service transmission delay, and a reverse service transmission delay. For example, LTE eNB1 collects statistics to obtain that a maximum forward service rate value of the service 2 of the terminal 1 on LTE eNB1 within 10 s is 400 kbps and an average value thereof is 300 kbps.

Step S1006: The terminal 1 establishes a connection with a target network element, and all or some services are migrated to the target network element through switching or service distribution. The target network element may be an LTE base station, a 3G base station, a 2G base station, or a WLAN base station. For example, the target network element in the present embodiment is WLAN AP1. The terminal decides to distribute the service 2 on APN2 to the target network element. In the switching or distributing process, the source network element may transfer the service performance information of the terminal 1, obtained by previous statistics, via a direct interface or an indirect interface.

Step S1008: The target network element collects statistics of service performance information obtained by the terminal 1 on the target network element within a period of time Ts, the service performance information including one or a combination of the following parameters: a forward service rate, a reverse service rate, a forward service transmission delay, and a reverse service transmission delay. For example, the target network element collects statistics to obtain that a maximum forward service rate value of the service 2 of the terminal 1 on the target network element within 10 s is 300 kbps and an average value thereof is 250 kbps.

Further, the target network element may calculate a change situation of the service performance after the service 2 of the terminal 1 is switched or distributed to the target network element. The change situation of the service performance includes one or a combination of the following information:

change rate of forward service rate=(forward service rate after service migration-forward service rate before service migration)/forward service rate before service migration*100%;

change rate of reverse service rate=(reverse service rate after service migration-reverse service rate before service migration)/reverse service rate before service migration*100%;

change rate of forward service rate=(forward service rate after service migration-configured service rate threshold)/configured service rate threshold*100%;

change rate of reverse service rate=(reverse service rate after service migration-configured service rate threshold)/configured service rate threshold*100%;

change rate of forward service transmission delay=(forward service transmission delay after service migration-forward service transmission delay before service migration)/forward service transmission delay before service migration*100%;

change rate of reverse service transmission delay=(reverse service transmission delay after service migration-reverse service transmission delay before service migration)/reverse service transmission delay before service migration*100%;

change rate of forward service transmission delay=(forward service transmission delay after service migration-configured delay threshold)/configured delay threshold*100%; and change rate of reverse service transmission delay=(reverse service transmission delay after service migration-configured delay threshold)/configured delay threshold*100%.

For example, in the present embodiment, the target network element calculates the following change situation of the service performance by using the maximum forward service rate values before and after service migration, which are obtained from the source side and obtained, through analysis, by the target network element:

change rate 1 of forward service rate=(300−400)/400*100%=−25%.

Or, the target network element calculates the following change situation of the service performance according to a pre-configured forward service rate threshold value 500 kbps for the service and the maximum forward service rate values before and after service migration, which are obtained, through analysis, by the target network element:

change rate 2 of forward service rate=(300−500)/500*100%=−40%.

Further, the target network element may set a service performance change indicator, namely a service performance deterioration indicator, according to the above-mentioned information.

Step S1010: The target network element transfers the service performance information of the terminal 1, obtained by statistics, to the source network element via a direct interface or an indirect interface. For example, the target network element may cache current statistical data, which is marked as a statistical data set 1. The target network element may transfer this statistical data set 1 to the source network element when statistical time is up. The target network element may also cache this statistical data set 1, and then collect statistics again at a time interval. When the source network element sends a statistical data transfer request to the target network element subsequently, the target network element replies by transferring the statistical data, e.g., by transferring latest N (e.g., N=1, 2, 3, . . . ) statistical data sets to the source network element. The statistical data set may be organized in the following manner as shown in Table 2-1.

TABLE 2-1

| | |
|---|---|
| Statistical count N | 1 |
| Terminal identifier | UE1 |
| Service identifier | Service 2 (or APN2) |
| Source network element identifier | LTE eNB1 |
| Maximum forward service rate value (source network element) | 400 kbps |
| Target network element identifier | AP1 |
| Forward service rate threshold value of service 2 | 500 kbps |
| Maximum forward service rate value (target network element) | 300 kbps |
| Change rate of the forward service rate 1 | −25% |
| Change rate 2 of forward service rate | −40% |
| Service performance change indicator | Service performance deterioration |

Step S1012: A terminal 2 executes operations similar to the operations of the terminal 1. That is, the terminal 2 executes Step S1002-S1010.

Step S1014: The source network element searches for service performance information obtained on the target network element by a plurality of terminals. As shown in Table 2-2, the information is used for adjusting a service migration parameter or a service migration policy of a subsequent user for the target network element.

For example, when the source network element obtains service performance information of UE1, the source network element may consider that the service experience goes bad after the service 2 of the terminal is distributed, so the source network element may directly reduce the switching or distributing priority of the target network element AP1, or indirectly reduce the switching or distributing priority of the target network element AP1 by appropriately improving a signal strength threshold of the target network element AP1, so that the probability of distributing services 2 of other subsequent terminals to AP1 is reduced.

Subsequently, the source network element obtains service performance information of UE2 and UE3, and the source network element may perform comprehensive evaluation according to service performance improvement indicators of UE2 and UE3 to consider that the service experience is improved after the service 2 of the terminal is distributed to AP1. As a result, the source network element may directly improve the switching or distributing priority of the target network element AP1, or indirectly improve the switching or distributing priority of the target network element AP1 by appropriately reducing a signal strength threshold of the target network element AP1, so that services 2 of other subsequent terminals may be preferentially distributed to AP1 with a higher probability.

TABLE 2-2

| | | | | |
|---|---|---|---|---|
| Terminal identifier | UE1 | UE2 | UE3 | . . . |

TABLE 2-2-continued

| Service identifier | Service 2 (or APN2) | Service 2 (or APN2) | Service 2 (or APN2) | . . . |
|---|---|---|---|---|
| Source network element identifier | LTE eNB1 | LTE eNB1 | LTE eNB1 | . . . |
| Target network element identifier | AP1 | AP1 | AP1 | . . . |
| Service performance change indicator | −25% | 20% | 30% | . . . |

Embodiment 3

Figure 11:
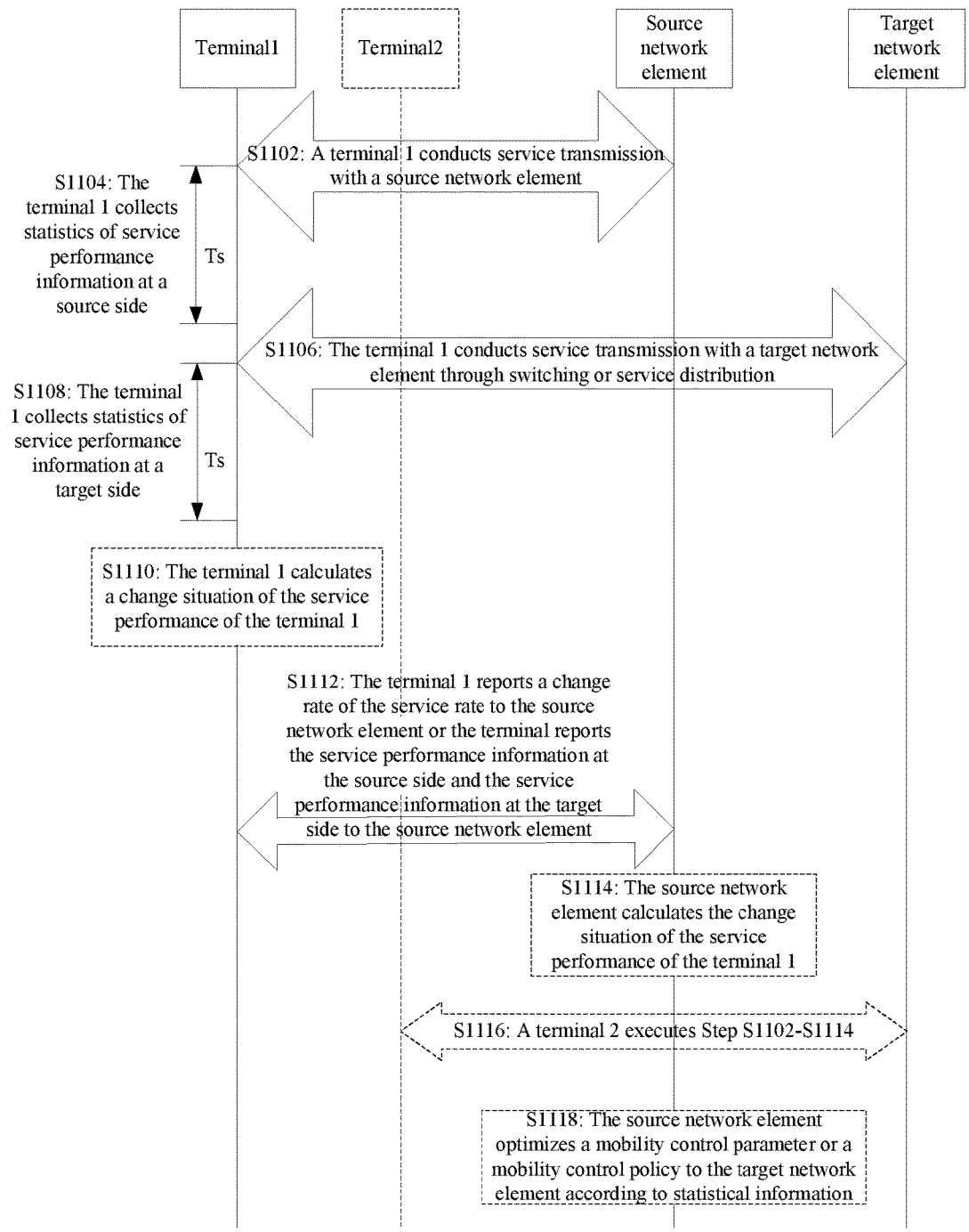
FIG. 11 is a schematic diagram of a flow of reporting, by a terminal, statistical information of service performance or user experience according to an embodiment 3 of the present disclosure.

FIG. 11 shows a flow of reporting, by a terminal, statistical information of service performance or user experience. As shown in FIG. 11, the flow includes the following processing steps.

Step S1102: A terminal 1 establishes a connection with a source network element and conducts service transmission. The source network element may be an LTE base station, a 3G base station, a 2G base station, or a WLAN base station. For example, the source network element in the present embodiment is LTE eNB1; and in two services being executed by the terminal on the source network element, a service 1 is a service to APN1, and a service 2 is a service to APN2.

Step S1104: The terminal 1 collects statistics of service performance information obtained at the source network element on a certain statistical granularity within a period of time Ts, the service performance information including one or a combination of the following parameters: a forward service rate, a reverse service rate, a forward service transmission delay, and a reverse service transmission delay. For example, the terminal 1 collects statistics to obtain that a maximum forward service rate value of the service 2 on the source network element within 10 s is 400 kbps and an average value thereof is 300 kbps.

Step S1106: The terminal 1 establishes a connection with a target network element, and all or some services are migrated to the target network element through switching or service distribution. The target network element may be an LTE base station, a 3G base station, a 2G base station, or a WLAN base station. For example, the target network element in the present embodiment is WLAN AP1. The terminal decides to distribute the service 2 on APN2 to the target network element.

Step S1108: The terminal 1 collects statistics of service performance information obtained at the target network element on a certain statistical granularity within a period of time Ts, the service performance information including one or a combination of the following parameters: a forward service rate, a reverse service rate, a forward service transmission delay, and a reverse service transmission delay. For example, the terminal 1 collects statistics to obtain that a maximum forward service rate value of the service 2 on the target network element within 10 s is 600 kbps and an average value thereof is 400 kbps.

Step S1110: The terminal 1 calculates a change situation of the service performance after the service is switched or distributed to the target network element, the change situation of the service performance including one or a combination of the following information:

change rate of forward service rate=(forward service rate after service migration-forward service rate before service migration)/forward service rate before service migration*100%;

change rate of reverse service rate=(reverse service rate after service migration-reverse service rate before service migration)/reverse service rate before service migration*100%;

change rate of forward service rate=(forward service rate after service migration-configured service rate threshold)/configured service rate threshold*100%;

change rate of reverse service rate=(reverse service rate after service migration-configured service rate threshold)/configured service rate threshold*100%;

change rate of forward service transmission delay=(forward service transmission delay after service migration-forward service transmission delay before service migration)/forward service transmission delay before service migration*100%;

change rate of reverse service transmission delay=(reverse service transmission delay after service migration-reverse service transmission delay before service migration)/reverse service transmission delay before service migration*100%;

change rate of forward service transmission delay=(forward service transmission delay after service migration-configured delay threshold)/configured delay threshold*100%; and change rate of reverse service transmission delay=(reverse service transmission delay after service migration-configured delay threshold)/configured delay threshold*100%.

For example, in the present embodiment, the terminal calculates the following change situation of the service performance by using the maximum forward service rate value:

change rate of forward service rate=(600-400)/400*100%=50%.

The data represents that the service 2 of the terminal 1 is distributed to WLAN AP1 from the LTE base station and the forward service rate performance is improved by 50%. It may be considered that this distribution may bring a better user experience.

Further, the terminal may set a service performance change indicator, namely a service performance improvement indicator, according to the above-mentioned information.

If the terminal does not collect statistics of the change situation of the service performance, this step is skipped.

Step S1112: The terminal 1 reports the service performance information obtained by statistics to a network. One of the following modes may be adopted.

a. The terminal 1 reports the service performance information obtained by statistics to the source network element.

b. The terminal 1 reports the service performance information obtained by statistics to a target side, and then the target side transfers the information to a source side via a direct interface or an indirect interface.

Further, the terminal 1 may cache current statistical data, which is marked as a statistical data set 1. The terminal 1 may report this statistical data set 1 to the network when statistical time is up. The terminal 1 may also cache this statistical data set 1, and then collect statistics at a time interval. When the network sends a statistical data reporting request to the terminal subsequently, the terminal replies by reporting the statistical data, e.g., by reporting latest N (e.g., N=1, 2, 3, . . . ) statistical data sets to the network. The statistical data set may be organized in the following manner as shown in Table 3-1.

TABLE 3-1

| | |
|---|---|
| Statistical count N | 1 |
| Terminal identifier | UE1 |
| Service identifier | Service 2 (or APN2) |
| Source network element identifier | LTE eNB1 |
| Maximum forward service rate value (source network element) | 400 kbps |
| Target network element identifier | AP1 |
| Maximum forward service rate value (target network element) | 600 kbps |
| Change rate of the forward service rate | 50% |
| Service performance change indicator | Service performance improvement |

If the terminal 1 executes Step S1110, the terminal 1 may directly report the calculated change situation of the service performance, wherein the change situation of the service performance may be reflected by using a change rate of the forward service rate, or a service performance change indicator. If the terminal 1 skips Step S1110, the terminal 1 may also report service performance information of the source side and service performance information of the target side, obtained by statistics, to the network.

Step S1114: If the terminal 1 reports the service performance information of the source side and service performance information of the target side, obtained by statistics, to the network in Step S1112, the source network element calculates a change situation of the service performance after the service of the terminal 1 is switched or distributed to the target network element, the change situation of the service performance including one or a combination of the following information:

change rate of forward service rate=(forward service rate after service migration-forward service rate before service migration)/forward service rate before service migration*100%;

change rate of reverse service rate=(reverse service rate after service migration-reverse service rate before service migration)/reverse service rate before service migration*100%;

change rate of forward service rate=(forward service rate after service migration-configured service rate threshold)/configured service rate threshold*100%;

change rate of reverse service rate=(reverse service rate after service migration-configured service rate threshold)/configured service rate threshold*100%;

change rate of forward service transmission delay=(forward service transmission delay after service migration-forward service transmission delay before service migration)/forward service transmission delay before service migration*100%;

change rate of reverse service transmission delay=(reverse service transmission delay after service migration-reverse service transmission delay before service migration)/reverse service transmission delay before service migration*100%;

change rate of forward service transmission delay=(forward service transmission delay after service migration-configured delay threshold)/configured delay threshold*100%; and change rate of reverse service transmission delay=(reverse service transmission delay after service migration-configured delay threshold)/configured delay threshold*100%.

Further, the source side may set a service performance change indicator, namely a service performance deterioration indicator, according to the above-mentioned information.

Step S1116: A terminal 2 executes operations similar to the operations of the terminal 1. That is, the terminal 2 executes Step S1102-S1114.

Step S1118: The source network element searches for service performance information obtained on the target network element by a plurality of terminals. As shown in Table 3-2, the information is used for adjusting a service migration parameter or a service migration policy of a subsequent user for the target network element.

For example, when the source network element obtains service performance information of UE1, after the service 2 of UE1 is distributed to WLAN AP1, the change rate of the forward service rate is 50%. It is supposed that a change rate of the service rate threshold is preset as 10%, the change rate of the forward service rate is a positive value, and exceeds a threshold greatly. It may be considered that a better service experience may be obtained after the service 2 of the terminal is distributed. Or, the source network element may consider, according to the service performance improvement indicator of UE1, that a better service experience may be obtained after the service 2 of the terminal is distributed. Under such a circumstance, the source network element may directly improve the switching or distributing priority of the target network element AP1, or indirectly improve the switching or distributing priority of the target network element AP1 by appropriately reducing a signal strength threshold of the target network element AP1, so that services 2 of other subsequent terminals may be preferentially distributed to AP1 with a higher probability.

Subsequently, the source network element obtains service performance information of UE2 and UE3, in which it is indicated that the change rate of the forward service rates thereof are both negative values −25%, and exceed the threshold greatly. The source network element performs comprehensive evaluation to consider that the service experience starts to go bad after the service 2 of the terminal is distributed to AN, or the source network element may consider, according to service performance deterioration indicators of UE2 and UE3, that the service experience starts to go bad after the service 2 of the terminal is distributed to AP1. Under such a circumstance, the source network element may directly reduce the switching or distributing priority of the target network element AP1, or indirectly reduce the switching or distributing priority of the target network element AP1 by appropriately improving a signal strength threshold of the target network element AP1, so that the probability of distributing services 2 of other subsequent terminals to AP1 is reduced.

TABLE 3-2

| Terminal identifier | UE1 | UE2 | UE3 | . . . |
|---|---|---|---|---|
| Service identifier | Service 2 (or APN2) | Service 2 (or APN2) | Service 2 (or APN2) | . . . |
| Source network element identifier | LTE eNB1 | LTE eNB1 | LTE eNB1 | . . . |
| Maximum forward service rate value (source network element) | 400 kbps | 400 kbps | 400 kbps | . . . |
| Target network element identifier | AP1 | AP1 | AP1 | . . . |

TABLE 3-2-continued

| | | | | |
|---|---|---|---|---|
| Maximum forward service rate value (target network element) | 600 kbps | 300 kbps | 300 kbps | . . . |
| Change rate of the forward service rate | 50% | −25% | −25% | . . . |
| Service performance improvement indicator | Service performance improvement | Service performance deterioration | Service performance deterioration | . . . |

Embodiment 4

Figure 12:
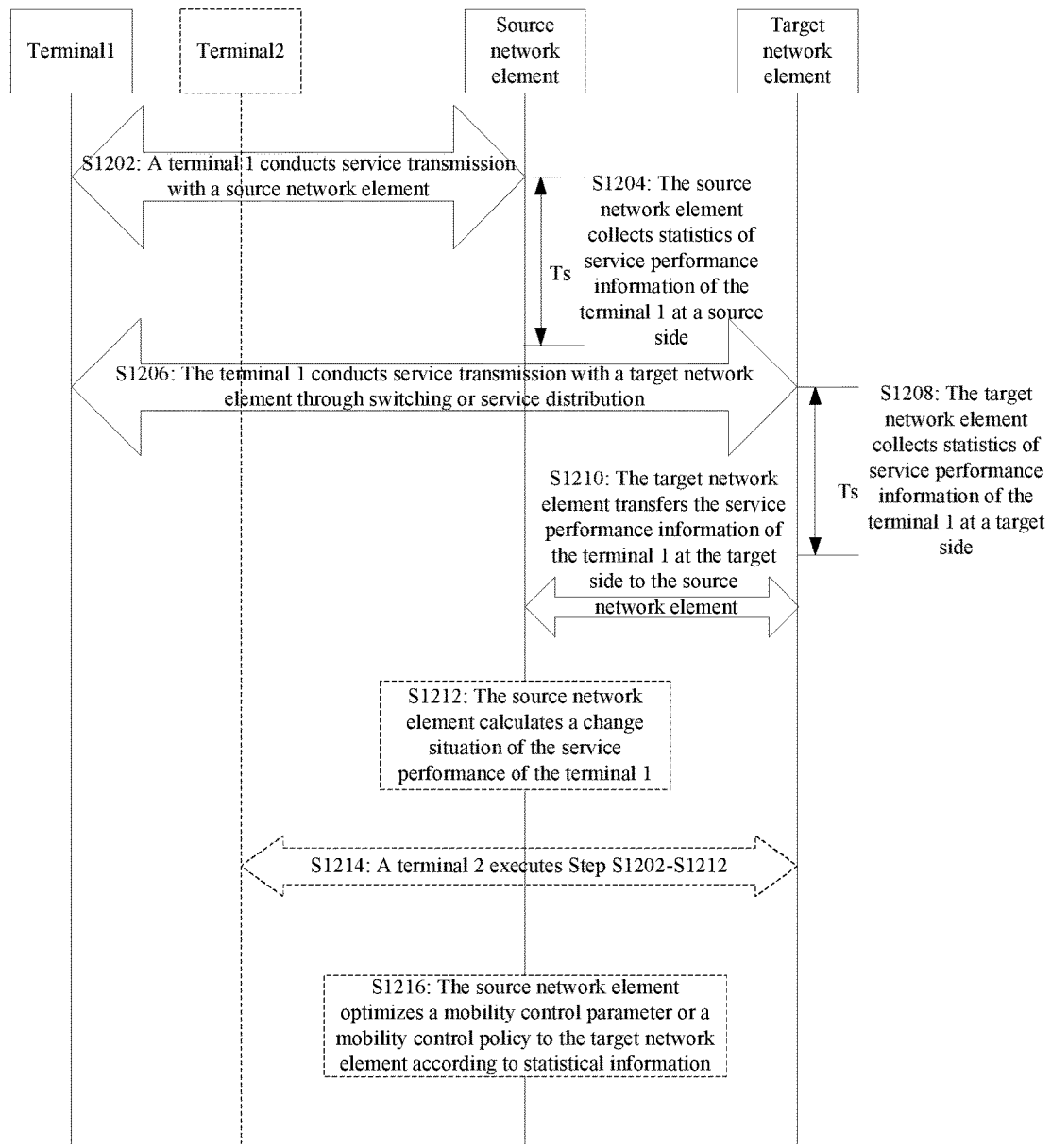
FIG. 12 is a schematic diagram of a flow of transferring statistical information of service performance or user experience between network elements according to an embodiment 4 of the present disclosure.

FIG. 12 shows a flow of transferring statistical information of service performance or user experience between network elements. As shown in FIG. 12, the flow includes the following processing steps.

Step S1202: A terminal 1 establishes a connection with a source network element and conducts service transmission. The source network element may be an LTE base station, a 3G base station, a 2G base station, or a WLAN base station. For example, the source network element in the present embodiment is LTE eNB1; and in two services being executed by the terminal on the source network element, a service 1 is a service to APN1, and a service 2 is a service to APN2.

Step S1204: The source network element collects statistics of service performance information obtained at the source network element on a certain statistical granularity within a period of time Ts, the service performance information including one or a combination of the following parameters: a forward service rate, a reverse service rate, a forward service transmission delay, and a reverse service transmission delay. For example, LTE eNB1 collects statistics to obtain that a maximum forward service rate value of the service 2 of the terminal 1 on LTE eNB1 within 10 s is 400 kbps and an average value thereof is 300 kbps.

Step S1206: The terminal 1 establishes a connection with a target network element, and all or some services are migrated to the target network element through switching or service distribution. The target network element may be an LTE base station, a 3G base station, a 2G base station, or a WLAN base station. For example, the target network element in the present embodiment is WLAN AP1. The terminal decides to distribute the service 2 on APN2 to the target network element.

Step S1208: The target network element collects statistics of service performance information obtained by the terminal 1 on the target network element within a period of time Ts, the service performance information including one or a combination of the following parameters: a forward service rate, a reverse service rate, a forward service transmission delay, and a reverse service transmission delay. For example, the target network element collects statistics to obtain that a maximum forward service rate value of the service 2 of the terminal 1 on the target network element within 10 s is 600 kbps and an average value thereof is 400 kbps.

Step S1210: The target network element transfers the service performance information of the terminal 1, obtained by statistics, to the source network element via a direct interface or an indirect interface. For example, the target network element may cache current statistical data, which is marked as a statistical data set 1. The target network element may transfer this statistical data set 1 to the source network element when statistical time is up. The target network element may also cache this statistical data set 1, and then collect statistics again at a time interval. When the source network element sends a statistical data transfer request to the target network element subsequently, the target network element replies by transferring the statistical data, e.g., by transferring latest N (e.g., N=1, 2, 3, . . . ) statistical data sets to the source network element. The statistical data set may be organized in the following manner as shown in Table 4-1.

TABLE 4-1

| | |
|---|---|
| Statistical count N | 1 |
| Terminal identifier | UE1 |
| Service identifier | Service 2 (or APN2) |
| Target network element identifier | AP1 |
| Maximum forward service rate value (target network element) | 600 kbps |

Step S1212: The source network element calculates a change situation of the service performance after the service 2 of the terminal 1 is switched or distributed to the target network element, the change situation of the service performance including one or a combination of the following information:

change rate of forward service rate=(forward service rate after service migration-forward service rate before service migration)/forward service rate before service migration*100%;

change rate of reverse service rate=(reverse service rate after service migration-reverse service rate before service migration)/reverse service rate before service migration*100%;

change rate of forward service rate=(forward service rate after service migration-configured service rate threshold)/configured service rate threshold*100%;

change rate of reverse service rate=(reverse service rate after service migration-configured service rate threshold)/configured service rate threshold*100%;

change rate of forward service transmission delay=(forward service transmission delay after service migration-forward service transmission delay before service migration)/forward service transmission delay before service migration*100%;

change rate of reverse service transmission delay=(reverse service transmission delay after service migration-reverse service transmission delay before service migration)/reverse service transmission delay before service migration*100%;

change rate of forward service transmission delay=(forward service transmission delay after service migration-configured delay threshold)/configured delay threshold*100%; and change rate of reverse service transmission delay=(reverse service transmission delay after service migration-configured delay threshold)/configured delay threshold*100%.

The statistical data set calculated by the source network element according to the maximum forward service rate value may be organized in the following manner as shown in Table 4-2.

TABLE 4-2

| | |
|---|---|
| Statistical count N | 1 |
| Terminal identifier | UE1 |

TABLE 4-2-continued

| | |
|---|---|
| Service identifier | Service 2 (or APN2) |
| Source network element identifier | LTE eNB1 |
| Maximum forward service rate value (source network element) | 400 kbps |
| Target network element identifier | AP1 |
| Maximum forward service rate value (target network element) | 600 kbps |
| Change rate of the forward service rate | 50% |

Step S1214: A terminal 2 executes operations similar to the operations of the terminal 1. That is, the terminal 2 executes Step S1202-S1212.

Step S1216: The source network element searches for service performance information obtained on the target network element by a plurality of terminals. As shown in Table 4-3, the information is used for adjusting a service migration parameter or a service migration policy of a subsequent user for the target network element.

For example, when the source network element obtains service performance information of UE1, after the service 2 of UE1 is distributed to WLAN AP1, the change rate of the forward service rate is 50%. It is supposed that a change rate of the service rate threshold is preset as 10%, the change rate of the forward service rate is a positive value, and exceeds a threshold greatly. It may be considered that a better service experience may be obtained after the service 2 of the terminal is distributed. As a consequence, the source network element may directly improve the switching or distributing priority of the target network element AP1, or indirectly improve the switching or distributing priority of the target network element AP1 by appropriately reducing a signal strength threshold of the target network element AP1, so that services 2 of other subsequent terminals may be preferentially distributed to AP1 with a higher probability.

Subsequently, the source network element obtains service performance information of UE2 and UE3, and the change rate of the forward service rates thereof are both negative values −25%, and exceed a threshold greatly. The source network element performs comprehensive evaluation to consider that the service experience starts to go bad after the service 2 of the terminal is distributed to AP1. As a consequence, the source network element may directly reduce the switching or distributing priority of the target network element AP1, or indirectly reduce the switching or distributing priority of the target network element AP1 by appropriately improving a signal strength threshold of the target network element AP1, so that the probability of distributing services 2 of other subsequent terminals to AP1 is reduced.

TABLE 4-3

| | | | | |
|---|---|---|---|---|
| Terminal identifier | UE1 | UE2 | UE3 | . . . |
| Service identifier | Service 2 (or APN2) | Service 2 (or APN2) | Service 2 (or APN2) | . . . |
| Source network element identifier | LTE eNB1 | LTE eNB1 | LTE eNB1 | . . . |
| Maximum forward service rate value (source network element) | 400 kbps | 400 kbps | 400 kbps | . . . |
| Target network element identifier | AP1 | AP1 | AP1 | . . . |
| Maximum forward service rate value (target network element) | 600 kbps | 300 kbps | 300 kbps | . . . |
| Change rate of the forward service rate | 50% | −25% | −25% | . . . |

Embodiment 5

Figure 13:
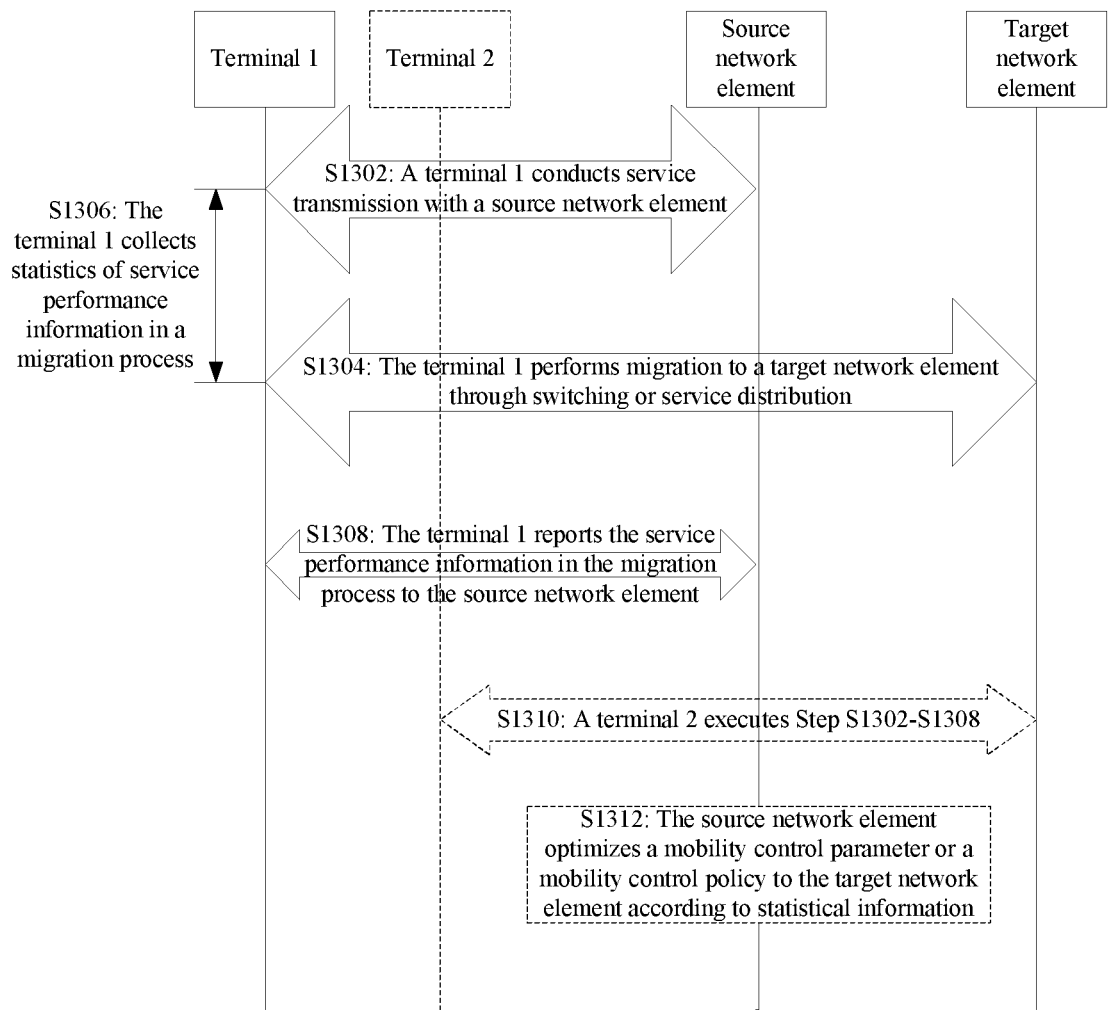
FIG. 13 is a schematic diagram of a flow of reporting, by a terminal, statistical information of service performance or user experience according to an embodiment 5 of the present disclosure.

FIG. 13 shows a flow of reporting, by a terminal, statistical information of service performance or user experience. As shown in FIG. 13, the flow includes the following processing steps.

Step S1302: A terminal 1 establishes a connection with a source network element and conducts service transmission. The source network element may be an LTE base station, a 3G base station, a 2G base station, or a WLAN base station. For example, the source network element in the present embodiment is LTE eNB1; and in two services being executed by the terminal on the source network element, a service 1 is a service to APN1, and a service 2 is a service to APN2.

Step S1304: The terminal 1 establishes a connection with a target network element, and all or some services are migrated to the target network element through switching or service distribution. The target network element may be an LTE base station, a 3G base station, a 2G base station, or a WLAN base station. For example, the target network element in the present embodiment is WLAN AP1. The terminal decides to distribute the service 2 on APN2 to the target network element.

Step S1306: The terminal 1 collects statistics of service performance information for a certain statistical granularity in a service migration process, the service performance information including one or a combination of the following parameters: a forward packet error rate or a forward packet loss rate, a reverse packet error rate or a reverse packet loss rate, and a transmission interruption duration, wherein a calculation mode of the forward/reverse packet error rate or the forward/reverse packet loss rate is as follows.

Forward packet error rate or forward packet loss rate=(number of error forward packets or number of lost forward packets)/total number of forward service data packets*100%.

Reverse packet error rate or reverse packet loss rate=(number of error reverse packets or number of lost reverse packets)/total number of reverse service data packets*100%.

For example, in the present embodiment, the terminal collects statistics to obtain that the service transmission interruption duration is 100 ms in a process of distributing the service 2 from LTE eNB1 to WLAN AP1.

Step S1308: The terminal 1 reports the service performance information obtained by statistics to a network. One of the following modes may be adopted.

a. The terminal 1 reports the service performance information obtained by statistics to the source network element.

b. The terminal 1 reports the service performance information obtained by statistics to a target side, and then the target side transfers the information to a source side via a direct interface or an indirect interface.

Further, the terminal 1 may cache current statistical data, which is marked as a statistical data set 1. The terminal 1 may report this statistical data set 1 to the network when the switching or distributing process is ended. The terminal 1 may also cache this statistical data set 1. When the network sends a statistical data reporting request to the terminal subsequently, the terminal replies by reporting the statistical data, e.g., by reporting the statistical data set to the network. The statistical data set may be organized in the following manner as shown in Table 5-1.

TABLE 5-1

| | |
|---|---|
| Terminal identifier | UE1 |
| Service identifier | Service 2 (or APN2) |
| Source network element identifier | LTE eNB1 |
| Target network element identifier | AP1 |
| Service transmission interruption duration | 100 ms |

Step S1310: A terminal 2 executes operations similar to the operations of the terminal 1. That is, the terminal 2 executes Step S1302-S1308.

Step S1312: The source network element searches for service performance information of the service migration process, reported by a plurality of terminals. As shown in Table 5-2, the information is used for adjusting a service migration parameter or a service migration policy of a subsequent user for the target network element.

For example, when the source network element obtains service performance information of the service migration process of UE1, in a process of distributing the service 2 of UE1 from LTE eNB1 to WLAN AP1, the service transmission interruption duration is 100 ms. It is supposed that a service transmission interruption duration threshold is preset as 300 ms, so the service transmission interruption duration does not exceed the threshold. It may be considered that the service experience of the service 2 of the terminal in a distribution process is better. Under such a circumstance, the source network element may directly improve the switching or distributing priority of the target network element AP1, or indirectly improve the switching or distributing priority of the target network element AP1 by appropriately reducing a signal strength threshold of the target network element AP1, so that services 2 of other subsequent terminals may be preferentially distributed to AP1 with a higher probability.

Subsequently, the source network element obtains service performance information of UE2 and UE3, and the service transmission interruption durations thereof in the service migration process are 1000 ms and 600 ms, and both exceed the service transmission interruption duration threshold greatly. The source network element performs comprehensive evaluation to consider that the service experience of the service 2 of the terminal in the distribution process starts to go bad. As a consequence, the source network element may directly reduce the switching or distributing priority of the target network element AP1, or indirectly reduce the switching or distributing priority of the target network element AP1 by appropriately improving a signal strength threshold of the target network element AP1, so that the probability of distributing services 2 of other subsequent terminals to AP1 is reduced.

TABLE 5-2

| Terminal identifier | UE1 | UE2 | UE3 | ... |
|---|---|---|---|---|
| Service identifier | Service 2 (or APN2) | Service 2 (or APN2) | Service 2 (or APN2) | ... |
| Source network element identifier | LTE eNB1 | LTE eNB1 | LTE eNB1 | ... |
| Target network element identifier | AP1 | AP1 | AP1 | ... |

TABLE 5-2-continued

| | | | | |
|---|---|---|---|---|
| Service transmission interruption duration | 100 ms | 1000 ms | 600 ms | ... |

Embodiment 6

Figure 14:
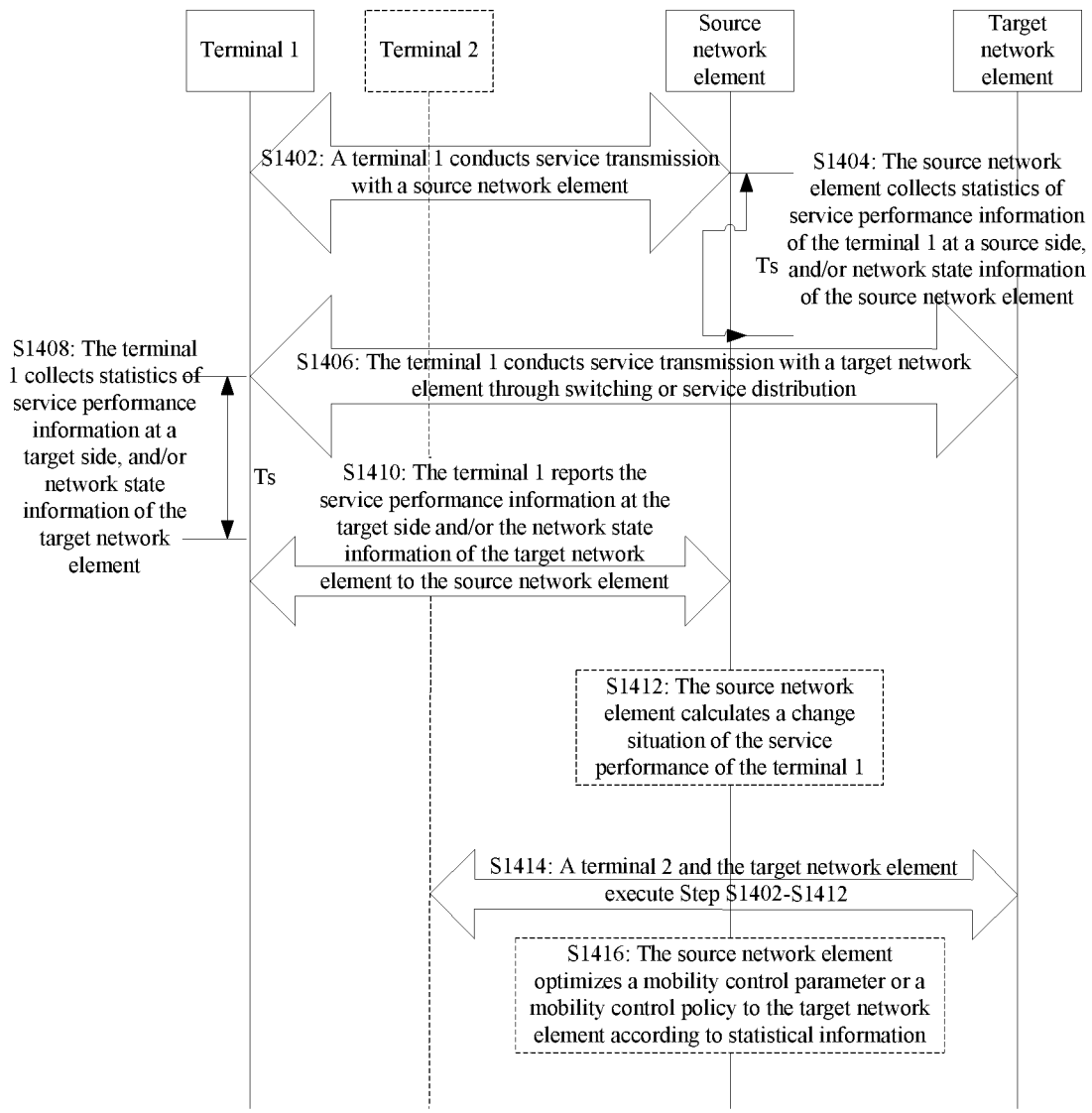
FIG. 14 is a schematic diagram of a flow of reporting, by a terminal, statistical information of service performance or user experience according to an embodiment 6 of the present disclosure.

FIG. 14 shows a flow of reporting, by a terminal, statistical information of service performance or user experience. As shown in FIG. 14, the flow includes the following processing steps.

Step S1402: A terminal 1 establishes a connection with a source network element and conducts service transmission. The source network element may be an LTE base station, a 3G base station, a 2G base station, or a WLAN base station. For example, the source network element in the present embodiment is LTE eNB1; and in two services being executed by the terminal on the source network element, a service 1 is a service to APN1, and a service 2 is a service to APN2.

Step S1404: The source network element collects statistics of service performance information obtained at the source network element on a certain statistical granularity within a period of time Ts, the service performance information including one or a combination of the following parameters: a forward service rate, a reverse service rate, a forward service transmission delay, and a reverse service transmission delay. For example, LTE eNB1 collects statistics to obtain that a maximum forward service rate value of the service 2 of the terminal 1 on LTE eNB1 within 10 s is 400 kbps and an average value thereof is 300 kbps.

Step S1406: The terminal 1 establishes a connection with a target network element, and all or some services are migrated to the target network element through switching or service distribution. The target network element may be an LTE base station, a 3G base station, a 2G base station, or a WLAN base station. For example, the target network element in the present embodiment is WLAN AP1. The terminal decides to distribute the service 2 on APN2 to the target network element. The source network element LTE eNB1 records network state information of the source network element during triggering of a service migration process, wherein the information may include one or a combination of: a signal strength of LTE eNB1 during triggering of the service migration, and a load situation of LTE eNB1 during triggering of the service migration.

Step S1408: The terminal 1 collects statistics of service performance information obtained by the service 2 thereof on the target network element within a period of time Ts, the service performance information including one or a combination of the following parameters: a forward service rate, a reverse service rate, a forward service transmission delay, and a reverse service transmission delay. The terminal 1 may also record network state information of the target network element. For example, the terminal 1 collects statistics to obtain that a maximum forward service rate value of the service 2 on WLAN AP1 within 10 s is 600 kbps and an average value thereof is 400 kbps. The terminal records network state information of WLAN AP1, wherein the information may include one or a combination of: a signal strength of WLAN AP1 during ending of service migration, a load situation of WLAN AP1 during ending of service migration, an uplink/downlink condition of WLAN AP1 during ending of service migration, an average signal strength of WLAN AP1 within a statistical time period, an average load situation of WLAN AP1 within a statistical time period, and an average uplink/downlink condition of WLAN AP1 within a statistical time period.

Step S1410: The terminal 1 reports the service performance information obtained by statistics and/or the state information of the target network element to a network. One of the following modes may be adopted.

a. The terminal 1 reports the service performance information obtained by statistics and/or the state information of the target network element to the source network element.

b. The terminal 1 reports the service performance information obtained by statistics and/or the state information of the target network element to a target side, and then the target side transfers the information to a source side via a direct interface or an indirect interface.

Further, the terminal 1 may cache current statistical data, which is marked as a statistical data set 1. The terminal 1 may report this statistical data set 1 to the network when the switching or distributing process is ended. The terminal 1 may also cache this statistical data set 1. When the network sends a statistical data reporting request to the terminal subsequently, the terminal replies by reporting the statistical data, e.g., by reporting the statistical data set to the network. The statistical data set may be organized in the following manner as shown in Table 6-1.

TABLE 6-1

| | |
|---|---|
| Statistical count N | 1 |
| Terminal identifier | UE1 |
| Service identifier | Service 2 (or APN2) |
| Target network element identifier | AP1 |
| Maximum forward service rate value (target network element) | 600 kbps |
| Signal strength of WLAN AP1 during ending of service migration | 10 dB |
| Load situation of WLAN AP1 during ending of service migration | 50% |
| Uplink condition of WLAN AP1 during ending of service migration | 500 kbps |
| Downlink condition of WLAN AP1 during ending of service migration | 700 kbps |
| Average signal strength of WLAN AP1 within statistical time period | 8 dB |
| Average load situation of WLAN AP1 within statistical time period | 40% |
| Average uplink condition of WLAN AP1 within statistical time period | 450 kbps |
| Average downlink condition of WLAN AP1 within statistical time period | 650 kbps |

Step S1412: The source network element calculates a change situation of the service performance after the service 2 of the terminal 1 is switched or distributed to the target network element, the change situation of the service performance including one or a combination of the following information:

change rate of forward service rate=(forward service rate after service migration-forward service rate before service migration)/forward service rate before service migration*100%;

change rate of reverse service rate=(reverse service rate after service migration-reverse service rate before service migration)/reverse service rate before service migration*100%;

change rate of forward service rate=(forward service rate after service migration-configured service rate threshold)/configured service rate threshold*100%;

change rate of reverse service rate=(reverse service rate after service migration-configured service rate threshold)/configured service rate threshold*100%;

change rate of forward service transmission delay=(forward service transmission delay after service migration-forward service transmission delay before service migration)/forward service transmission delay before service migration*100%;

change rate of reverse service transmission delay=(reverse service transmission delay after service migration-reverse service transmission delay before service migration)/reverse service transmission delay before service migration*100%;

change rate of forward service transmission delay=(forward service transmission delay after service migration-configured delay threshold)/configured delay threshold*100%; and change rate of reverse service transmission delay=(reverse service transmission delay after service migration-configured delay threshold)/configured delay threshold*100%.

The statistical data set calculated by the source network element according to the maximum forward service rate value may be organized in the following manner as shown in Table 6-2.

TABLE 6-2

| | |
|---|---|
| Statistical count N | 1 |
| Terminal identifier | UE1 |
| Service identifier | Service 2 (or APN2) |
| Source network element identifier | LTE eNB1 |
| Maximum forward service rate value (source network element) | 400 kbps |
| Signal strength of LTE eNB1 during triggering of the service migration | 3 dB |
| Load situation of LTE eNB1 during triggering of the service migration | 80% |
| Target network element identifier | AP1 |
| Maximum forward service rate value (target network element) | 600 kbps |
| Change rate of the forward service rate | 50% |
| Signal strength of WLAN AP1 during ending of service migration | 10 dB |
| Load situation of WLAN AP1 during ending of service migration | 30% |
| Uplink condition of WLAN AP1 during ending of service migration | 500 kbps |
| Downlink condition of WLAN AP1 during ending of service migration | 700 kbps |
| Average signal strength of WLAN AP1 within statistical time period | 8 dB |
| Average load situation of WLAN AP1 within statistical time period | 35% |
| Average uplink condition of WLAN AP1 within statistical time period | 450 kbps |
| Average downlink condition of WLAN AP1 within statistical time period | 650 kbps |

Step S1414: A terminal 2 executes operations similar to the operations of the terminal 1. That is, the terminal 2 executes Step S1402-S1412.

Step S1416: The source network element searches for service performance information obtained on the target network element by a plurality of terminals. The information is used for adjusting a service migration parameter or a service migration policy of a subsequent user for the target network element.

For example, the source network element initially sets a threshold condition of distribution of the terminal from the source network element to the target network element as shown in Table 6-3.

TABLE 6-3

| | |
|---|---|
| Service identifier | Service 2 (or APN2) |
| Target network element identifier | WLAN AP1 |

TABLE 6-3-continued

| Signal strength threshold of source network element | <=3 dB |
| Load situation threshold of source network element | >=70% |
| Signal strength threshold of target network element | >=9 dB |
| Load situation threshold of target network element | <=30% |
| Uplink condition of target network element | >=300 kbps |
| Downlink condition of target network element | >=500 kbps |

When the source network element obtains service performance information of UE1, UE2 and UE3, all or some pieces of statistical information may be comprehensively analyzed to adjust a service migration parameter or a service migration policy of a subsequent user for the target network element. A statistical analysis table example constructed by the source network element is as shown in Table 6-4.

TABLE 6-4

| Terminal identifier | UE1 | UE2 | UE3 | ... |
|---|---|---|---|---|
| Service identifier | Service 2 (or APN2) | Service 2 (or APN2) | Service 2 (or APN2) | ... |
| Source network element identifier | eNB1 | eNB1 | eNB1 | ... |
| Maximum forward service rate value (source network element) | 400 kbps | 400 kbps | 400 kbps | ... |
| Signal strength of LTE eNB1 during triggering of the service migration | 2 dB | 3 dB | 3 dB | ... |
| Load situation of LTE eNB1 during triggering of the service migration | 80% | 80% | 80% | ... |
| Target network element identifier | AP1 | AP1 | AP1 | ... |
| Maximum forward service rate value (target network element) | 600 kbps | 500 kbps | 500 kbps | ... |
| Change rate of the forward service rate | 50% | 25% | 25% | ... |
| Signal strength of WLAN AP1 during ending of service migration | 10 dB | 8 dB | 7 dB | ... |
| Load situation of WLAN AP1 during ending of service migration | 30% | 40% | 30% | ... |

After distribution of the service 2 of UE1 is completed, an actual network state situation of the target network element thereof satisfies a distribution threshold condition preset by the source network element, and after the service 2 is distributed to WLAN AP1, the change rate of the forward service rate is 50%. It is supposed that a change rate of the service rate threshold is preset as 10%, the change rate of the forward service rate is a positive value, and exceeds the threshold greatly. It may be considered that a better service experience may be obtained after the service 2 of the terminal is distributed on the basis of the existing condition.

After distribution of services 2 of UE2 and UE3, an actual network state situation of the target network element thereof does not satisfy a distribution threshold condition preset by the source network element, but the change rate of the forward service rates are both 25%. It is supposed that a change rate of the service rate threshold is preset as 10%, the change rate of the forward service rates are positive values likewise, and exceed the threshold greatly. It may be considered that a better service experience may be also obtained after the services 2 of UE2 and UE3 are distributed. The source network element performs comprehensive evaluation to consider that the preset distribution threshold condition may be appropriately adjusted. The adjusted distribution threshold condition is as shown in Table 6-5.

TABLE 6-5

| Service identifier | Service 2 (or APN2) |
| Target network element identifier | WLAN AP1 |
| Signal strength threshold of source network element | <=3 dB |
| Load situation threshold of source network element | >=70% |
| Signal strength threshold of target network element | >=8 dB |
| Load situation threshold of target network element | <=40% |
| Uplink condition of target network element | >=300 kbps |
| Downlink condition of target network element | >=500 kbps |

Figure 15A:
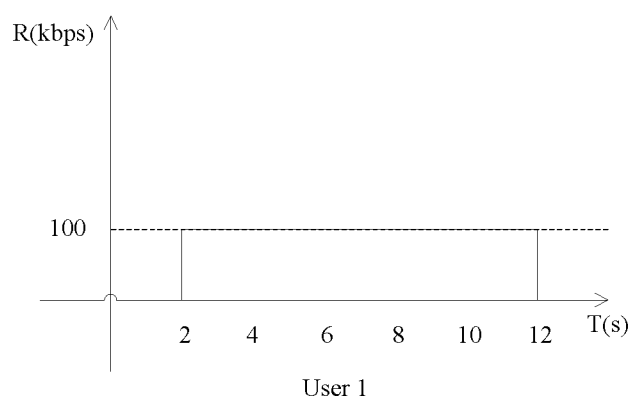
FIG. 15a is a schematic diagram of stable service transmission according to an embodiment 6 of the present disclosure.
Figure 15B:
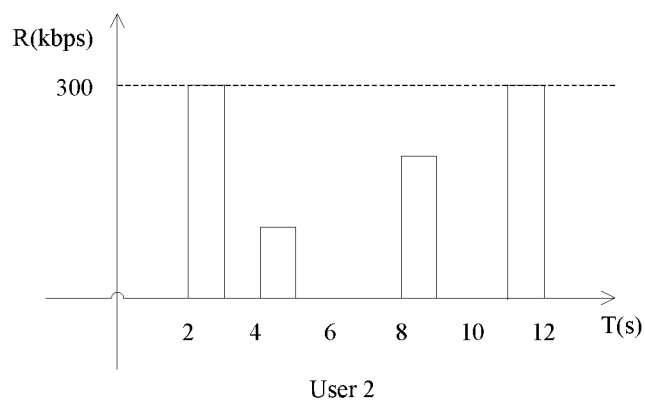
FIG. 15b is a schematic diagram of burst service transmission according to an embodiment 6 of the present disclosure.

On the basis of FIGS. 15 (a, b), the difference of different service rate statistical modes is briefly described.

In FIG. 15a, a user 1 transmits a stable service, and in FIG. 5b, a user 2 transmits a burst service.

A service rate of the user 1 may be calculated by means of one of the following forms.

Maximum value of service rate=100 kbps.

Effective average value of service rate=100 kbps*10 s/10 s=100 kbps.

Statistical average value of service rate=100 kbps*10 s/10 s=100 kbps.

A service rate of the user 2 may be calculated by means of one of the following forms.

Maximum value of service rate=300 kbps.

Effective average value of service rate=(300+100+200+300)kbps/4 s=225 kbps.

Statistical average value of service rate=(300+100+200+300)kbps/10 s=90 kbps.

It may be seen that for the user 2, if resources are allocated on the basis of a demand of the maximum value of the service rate, it can be ensured that the best user experience is obtained, but system resources are relatively wasted. If resources are allocated on the basis of a demand of the statistical average value of the service rate, the experience of the user in terms of the peak rate is poorer, but the system resources are saved, and the total throughput can be ensured for a long term. If resources are allocated on the basis of a demand of the effective average value of the service rate, it may be regarded as a compromise proposal.

Embodiment 7

Figure 16:
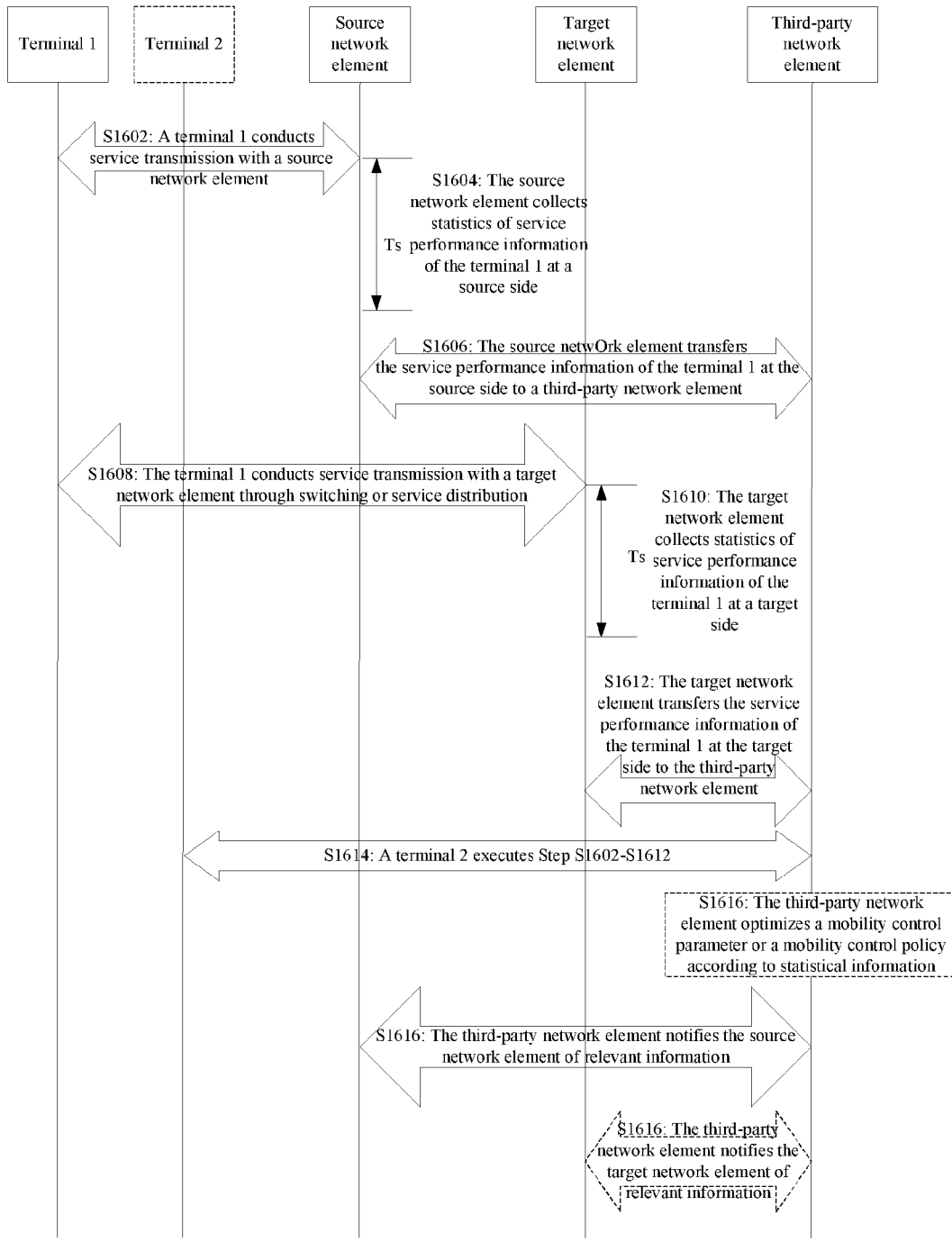
FIG. 16 is a schematic diagram of a flow of reporting, by a terminal, statistical information of service performance or user experience according to an embodiment 7 of the present disclosure.

As shown in FIG. 16, a flow of reporting, by a terminal, statistical information of service performance or user experience, provided by the present embodiment, includes the following processing steps.

Step S1602: A terminal 1 establishes a connection with a source network element and conducts service transmission. The source network element may be an LTE base station, a 3G base station, a 2G base station, or a WLAN base station. For example, the source network element in the present embodiment is LTE eNB1; and in two services being executed by the terminal on the source network element, a service 1 is a service to APN1, and a service 2 is a service to APN2.

Step S1604: The source network element collects statistics of service performance information obtained at the source network element on a certain statistical granularity within a period of time Ts, the service performance information including one or a combination of the following parameters: a forward service rate, a reverse service rate, a forward service transmission delay, and a reverse service transmission delay. For example, LTE eNB1 collects statistics to obtain that a maximum forward service rate value of the service 2 of the terminal 1 on LTE eNB1 within 10 s is 400 kbps and an average value thereof is 300 kbps.

Step S1606: The source network element transfers the service performance information of the terminal 1, obtained by statistics, to a third-party network element via a direct interface or an indirect interface.

Step S1608: The terminal 1 establishes a connection with a target network element, and all or some services are migrated to the target network element through switching or service distribution. The target network element may be an LTE base station, a 3G base station, a 2G base station, or a WLAN base station. For example, the target network element in the present embodiment is WLAN AP1. The terminal decides to distribute the service 2 on APN2 to the target network element.

Step S1610: The target network element collects statistics of service performance information obtained by the terminal 1 on the target network element within a period of time Ts, the service performance information including one or a combination of the following parameters: a forward service rate, a reverse service rate, a forward service transmission delay, and a reverse service transmission delay. For example, the target network element collects statistics to obtain that a maximum forward service rate value of the service 2 of the terminal 1 on the target network element within 10 s is 300 kbps and an average value thereof is 250 kbps.

Step S1612: The target network element transfers the service performance information of the terminal 1, obtained by statistics, to the third-party network element via a direct interface or an indirect interface.

Further, the third-party network element may calculate a change situation of the service performance after the service 2 of the terminal 1 is switched or distributed to the target network element, the change situation of the service performance including one or a combination of the following information: a change rate of the forward service rate, a change rate of the reverse service rate, a change rate of the forward service transmission delay, and a change rate of the reverse service transmission delay.

For example, in the present embodiment, the third-party network element calculates the following change situation of the service performance according to information obtained from the source network element and the target network element:

change rate 1 of forward service rate=(300−400)/400*100%=−25%.

Or, the third-party network element calculates the following change situation of the service performance according to a pre-configured forward service rate threshold value 500 kbps for the service and the maximum forward service rate value after service migration, obtained from the target network element:

change rate 2 of forward service rate=(300−500)/500*100%=−40%.

Further, the third-party network element may set a service performance change indicator, namely a service performance deterioration indicator, according to the above-mentioned information.

The third-party network element obtains the following statistical data set:

TABLE 7-1

| | |
|---|---|
| Statistical count N | 1 |
| Terminal identifier | UE1 |
| Service identifier | Service 2 (or APN2) |
| Source network element identifier | LTE eNB1 |
| Maximum forward service rate value (source network element) | 400 kbps |
| Target network element identifier | AP1 |
| Forward service rate threshold value of service 2 | 500 kbps |
| Maximum forward service rate value (target network element) | 300 kbps |
| Change rate of the forward service rate 1 | −25% |
| Change rate 2 of forward service rate | −40% |
| Service performance change indicator | Service performance deterioration |

Step S1614: A terminal 2 executes operations similar to the operations of the terminal 1. That is, the terminal 2 executes Step S1602-S1612.

Step S1616: The third-party network element searches for service performance information of a plurality of terminals, as shown in Table 7-2. The information is used for adjusting a service migration parameter or a service migration policy of a subsequent user.

For example, when the third-party network element obtains service performance information of UE1, the third-party network element may consider, according to a service performance deterioration indicator of UE1, that the service experience goes bad after the service 2 of the terminal is distributed. Under such a circumstance, the third-party network element may directly reduce the switching or distributing priority of the target network element AP1, or indirectly reduce the switching or distributing priority of the target network element AP1 by appropriately improving a signal strength threshold of the target network element AP1, so that the probability of distributing services 2 of other subsequent terminals to AP1 is reduced.

Subsequently, the third-party network element obtains service performance information of UE2 and UE3, and the third-party network element may perform comprehensive evaluation according to service performance improvement indicators of UE2 and UE3 to consider that the service experience is improved after the service 2 of the terminal is distributed to AP1. Under such a circumstance, the third-party network element may directly improve the switching or distributing priority of the target network element AP1, or indirectly improve the switching or distributing priority of the target network element AP1 by appropriately reducing a signal strength threshold of the target network element AP1, so that services 2 of other subsequent terminals may be preferentially distributed to AP1 with a higher probability.

TABLE 7-2

| Terminal identifier | UE1 | UE2 | UE3 | . . . |
|---|---|---|---|---|

TABLE 7-2-continued

| Service identifier | Service 2 (or APN2) | Service 2 (or APN2) | Service 2 (or APN2) | ... |
|---|---|---|---|---|
| Source network element identifier | LTE eNB1 | LTE eNB1 | LTE eNB1 | ... |
| Target network element identifier | AP1 | AP1 | AP1 | ... |
| Service performance change indicator | −25% | 20% | 30% | ... |

In conclusion, the embodiments of the present disclosure achieve the following beneficial effects. By means of the technical solution in the above embodiments, a network side can more accurately judge an actual migration effect according to statistical information, thereby optimally controlling a service migration process of a terminal.

In a further embodiment, software is also provided. The software is arranged to execute the technical solutions described in the above-mentioned embodiments and exemplary implementation modes.

In a further embodiment, a storage medium is also provided. The storage medium stores the above-mentioned software, and the storage medium includes, but is not limited to, an optical disk, a floppy disk, a hard disk, an erasable memory, and the like.

Obviously, those skilled in the art should understand that all modules or all steps in the present disclosure may be implemented by using a general calculation apparatus, may be centralized on a single calculation apparatus or may be distributed on a network composed of a plurality of calculation apparatuses. Optionally, they may be implemented by using executable program codes of the calculation apparatuses. Thus, they may be stored in a storage apparatus and executed by the calculation apparatuses, the shown or described steps may be executed in a sequence different from the sequence under certain conditions, or they are manufactured into each integrated circuit module respectively, or a plurality of modules or steps therein is manufactured into a single integrated circuit module. Thus, the present disclosure is not limited to combination of any specific hardware and software.

The above is only the exemplary embodiments of the present disclosure, and not intended to limit the present disclosure. There may be various modifications and variations in the present disclosure for those skilled in the art. Any modifications, equivalent replacements, improvements and the like within the principle of the present disclosure shall fall within the protective scope defined by the appended claims of the present disclosure.

INDUSTRIAL APPLICABILITY

The technical solution provided in the embodiments of the present disclosure may be applied to an optimized processing process for service migration of a terminal. By using a technical way of reporting service performance information of a terminal in a service migration process to a node at the network side, the technical problem in the related art that the service performance or service experience, etc. of the terminal is not taken into account during service transmission between a terminal and a network or during service migration of a terminal is solved. The service performance and service experience can be obtained when the terminal conducts service transmission or service migration, thereby providing a powerful support for optimizing the service migration or service transmission of the terminal and improving the experience of a user.

What is claimed is:

1. An optimized processing method for service migration of a terminal, comprising:
    acquiring,
        when the terminal conducts service transmission with a network or
        when the terminal performs service migration between a source network element and a target network element, service performance information of the terminal;
    wherein the service performance information comprises at least one of:
        a change rate of the forward service rate and/or a change rate of the reverse service rate on a specified statistical granularity within a preset statistical time;
        a forward service transmission delay and/or a reverse service transmission delay on a specified statistical granularity within a preset statistical time;
        a change rate of the forward service transmission delay and/or a change rate of the reverse service transmission delay on a specified statistical granularity within a preset statistical time;
        a service transmission interruption duration on a specified statistical granularity within a preset statistical time;
        at least one of the following information on a specified statistical granularity within a preset statistical time: a change rate of the forward service throughput, and a change rate of the reverse service throughput; and
        a service performance change indicator, wherein the service performance change indicator comprises at least one of:
            a service performance deterioration indicator and
            a service performance improvement indicator.

2. The method as claimed in claim 1, wherein acquiring the service performance information of the terminal comprises one of:
    acquiring, by the terminal, the service performance information;
    acquiring, by the target network element, the service performance information; and acquiring, by the source network element, the service performance information.

3. The method as claimed in claim 1, wherein the change rate of the forward service rate is acquired by means of one of the following modes:
    change rate of forward service rate=(forward service rate after service migration−forward service rate before service migration)/forward service rate before service migration*100%; and
    change rate of forward service rate=(forward service rate after service migration−configured service rate threshold)/configured service rate threshold*100%; or,
    the change rate of the reverse service rate is acquired by means of one of the following modes:
    change rate of reverse service rate=(reverse service rate after service migration−reverse service rate before service migration)/reverse service rate before service migration*100%; and
    change rate of reverse service rate=(reverse service rate after service migration−configured service rate threshold)/configured service rate threshold*100%; or, the forward service transmission delay and/or the reverse service transmission delay comprises one of:
a maximum value of the forward service transmission delay or the reverse service transmission delay, measured within the preset statistical time; and
an average value of the forward service transmission delay or the reverse service transmission delay, which is equal to a ratio of a sum of transmission delays of each unit service within a statistical time to a total number of service units; or,
the change rate of the forward service transmission delay is acquired by means of one of the following modes:
change rate of forward service transmission delay=(forward service transmission delay after service migration-configured delay threshold)/configured delay threshold*100%; and
change rate of reverse service transmission delay=(reverse service transmission delay after service migration-reverse service transmission delay before service migration)/reverse service transmission delay before service migration*100%;
and/or,
the change rate of the reverse service transmission delay is acquired by means of the following mode:
change rate of reverse service transmission delay=(reverse service transmission delay after service migration-configured delay threshold)/configured delay threshold*100%;
and/or,
change rate of forward service throughput=(forward service throughput after service migration-forward service throughput before service migration)/forward service throughput before service migration*100%;
and/or
change rate of forward service throughput=(forward service throughput after service migration-configured service throughput threshold)/configured service throughput threshold*100%; and/or
change rate of reverse service throughput=(reverse service throughput after service migration-reverse service throughput before service migration)/reverse service throughput before service migration*100%;
and/or
change rate of reverse service throughput=(reverse service throughput after service migration-configured service throughput threshold)/configured service throughput threshold*100%.

4. The method as claimed in claim 1, wherein the specified statistical granularity comprises:
one or more terminals; and/or,
at least one of the following information for a terminal: an Access Point Name (APN), an Internet Protocol (IP) stream, a bearer, a service, and an application.

5. The method as claimed in claim 1, further comprising:
when the service performance information satisfies at least one of the following conditions, determining that service migration of the terminal to the target network element meets a preset requirement, and otherwise, determining that the service migration of the terminal to the target network element does not meet the preset requirement:
the change rate of the forward service rate and/or the change rate of the reverse service rate is a positive value; or,
the change rate of the forward service rate and/or the change rate of the reverse service rate is a positive value, and an absolute difference value between the change rate of the forward service rate and/or the change rate of the reverse service rate and a first threshold value is greater than a first specified value; or,
the change rate of the forward service transmission delay and/or the change rate of the reverse service transmission delay is a negative value; or,
the change rate of the forward service transmission delay and/or the change rate of the reverse service transmission delay is a negative value, and an absolute difference value
between the change rate of the forward service transmission delay and/or the change rate of the reverse service transmission delay and a second threshold value is greater than a second specified value;
the forward packet error rate or the reverse packet error rate is smaller than a third threshold value;
the change rate of the forward service throughput or the change rate of the reverse service throughput is a positive value;
the change rate of the forward service throughput or the change rate of the reverse service throughput is a positive value, and an absolute difference value between the change rate of the forward service throughput and/or the change rate of the reverse service throughput and a sixth threshold value is greater than a third specified value; and
the service performance change indicator indicates service performance improvement.

6. The method as claimed in claim 1, after acquiring the service performance information of the terminal, further comprising:
reporting the service performance information to a network element at a network side,
or,
collecting statistics of the service performance information on a specified statistical granularity.

7. The method as claimed in claim 6, wherein reporting the service performance information to the network element at the network side comprises one of:
when the network element at the network side is the source network element, reporting, by the terminal or the target network element, the service performance information to the network element at the network side; or, sending, by the terminal, the service performance information acquired by the terminal to the target network element, and then reporting, by the target network element, the service performance information to the network element at the network side;
when the network element at the network side is the target network element, reporting, by the source network element or the terminal, the service performance information to the network element at the network side; and
when the network element at the network side is a third-party network element, directly or indirectly reporting the service performance information to the network element at the network side by one of: the source network element, the target network element, and the terminal, wherein the third-party network element is network element except the source network element and the target network element.

8. The method as claimed in claim 7, wherein indirectly reporting the service performance information comprises one of:
reporting, by the source network element, the service performance information to the third-party network element via the target network element;

reporting, by the terminal, the service performance information to the third-party network element via the source network element;

reporting, by the terminal, the service performance information to the third-party network element via the target network element; and reporting, by the target network element, the service performance information to the third-party network element via the source network element.

9. The method as claimed in claim 6, wherein before the service performance information is reported to the network element at the network side, the method further comprises one of the following steps:

triggering reporting of the service performance information when the service performance information is acquired; and triggering reporting of the service performance information based on an event or a request.

10. The method as claimed in claim 6, further comprising:

matching the acquired service performance information or a statistical result of the service performance information with network state information of the target network element and/or the source network element.

11. The method as claimed in claim 10, wherein the network state information comprises at least one of:

a signal strength during triggering of the service migration, a load situation during triggering of the service migration, an uplink/downlink condition during triggering of the service migration, an average signal strength within a preset statistical time period, an average load situation within the preset statistical time period, and an average uplink/downlink condition within the preset statistical time period.

12. The method as claimed in claim 6, after the service performance information is reported to a network element at a network side, further comprising:

receiving, by the network element at the network side, service performance information, wherein the service performance information is service performance information in a process that a terminal conducts service transmission with a network or in a process that the terminal performs service migration between a source network element and a target network element; and adjusting, by the network element at the network side, a service migration parameter and/or a service migration policy according to the service performance information or a statistical result of the service performance information on a specified statistical granularity.

13. The method as claimed in claim 12, wherein the network element at the network side receives the service performance information from one of:

the terminal, the source network element and the target network element.

14. The method as claimed in claim 12, wherein the service migration parameter and/or the service migration policy comprises:

a service migration parameter and/or service migration policy of the terminal for a subsequent service migration process; and a service migration parameter and/or service migration policy of the source network element, the target network element or a third-party network element, wherein the third-party network element is network element except the source network element and the target network element.

15. The method as claimed in claim 12, wherein the service migration parameter comprises one of:

a seventh threshold value of a load situation of the source network element, an eighth threshold value of an uplink condition of the source network element, a ninth threshold value of a downlink condition of the source network element, a priority of the target network element, a tenth threshold value of a signal strength of the target network element, an eleventh threshold value of a load situation of the target network element, a twelfth threshold value of an uplink condition of the target network element, a thirteenth threshold value of a downlink condition of the target network element, and a fourteenth threshold value of a signal strength of the source network element.

16. The method as claimed in claim 15, wherein the service migration policy comprises: conducting service migration when one of the following conditions is satisfied:

the load situation of the source network element is greater than the seventh threshold value;

the uplink condition of the source network element is greater than the eighth threshold value;

the downlink condition of the source network element is greater than the ninth threshold value;

the signal strength of the target network element is greater than the tenth threshold value;

the load situation of the target network element is greater than the eleventh threshold value;

the uplink condition of the target network element is greater than the twelfth threshold value;

the downlink condition of the target network element is greater than the thirteenth threshold value; and the signal strength of the source network element is greater than the fourteenth threshold value.

17. The method as claimed in claim 12, wherein the network element at the network side comprises one of:

the source network element, the target network element, and a third-party network element, wherein the third-party network element is network element except the source network element and the target network element.

18. An optimized processing apparatus for a terminal service, comprising:

a determination module, arranged to determine that a terminal conducts service transmission with a network or the terminal performs service migration between a source network element and a target network element; and an acquisition module, arranged to acquire service performance information of the terminal when a determination result of the determination module is positive;

wherein the acquisition module is arranged to acquire at least one of the following service performance information:

a change rate of the forward service rate and/or a change rate of the reverse service rate on a specified statistical granularity within a preset statistical time;

a forward service transmission delay and/or a reverse service transmission delay on a specified statistical granularity within a preset statistical time;

a change rate of the forward service transmission delay and/or a change rate of the reverse service transmission delay on a specified statistical granularity within a preset statistical time;

a service transmission interruption duration on a specified statistical granularity within a preset statistical time;

at least one of the following information on a specified statistical granularity within a preset statistical time:

a change rate of the forward service throughput, and a change rate of the reverse service throughput; and
a service performance change indicator, wherein the service performance change indicator comprises at least one of:
a service performance deterioration indicator and
a service performance improvement indicator.

19. The apparatus as claimed in claim 18, further comprising:
a reporting module, arranged to report the service performance information to a network element at a network side;
or,
a statistical module, arranged to collect statistics of the service performance information on a specified statistical granularity.

20. A performance optimization apparatus for service migration of a terminal, applied to a network element at a network side, the apparatus comprising:
a receiving module, arranged to receive service performance information,
wherein the service performance information is service performance information in a process that the terminal conducts service transmission with a network or in a process that the terminal performs service migration between a source network element and a target network element; and
an adjustment module, arranged to adjust a service migration parameter and/or a service migration policy according to the service performance information or a statistical result of the service performance information on a specified statistical granularity;
wherein the receiving module is arranged to receive at least one of the following service performance information:
a change rate of the forward service rate and/or a change rate of the reverse service rate on a specified statistical granularity within a preset statistical time;
a forward service transmission delay and/or a reverse service transmission delay on a specified statistical granularity within a preset statistical time;
a change rate of the forward service transmission delay and/or a change rate of the reverse service transmission delay on a specified statistical granularity within a preset statistical time;
a service transmission interruption duration on a specified statistical granularity within a preset statistical time;
at least one of the following information on a specified statistical granularity within a preset statistical time: a change rate of the forward service throughput, and a change rate of the reverse service throughput; and
a service performance change indicator, wherein the service performance change indicator comprises at least one of:
a service performance deterioration indicator and
a service performance improvement indicator.

* * * * *